(12) United States Patent  (10) Patent No.: US 8,413,754 B2
Matsuda et al.  (45) Date of Patent: Apr. 9, 2013

(54) STRADDLE VEHICLE

(75) Inventors: Yoshiharu Matsuda, Akashi (JP);
Takafumi Matsumoto, Himeji (JP);
Hideaki Kawai, Akashi (JP); Masato Kogirima, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 127 days.

(21) Appl. No.: 12/973,794

(22) Filed: Dec. 20, 2010

(65) Prior Publication Data

US 2011/0155495 A1 Jun. 30, 2011

(30) Foreign Application Priority Data

Dec. 29, 2009 (JP) ................................ 2009-299198
Jul. 30, 2010 (JP) ................................ 2010-172525

(51) Int. Cl.
*B62K 11/00* (2006.01)

(52) U.S. Cl. ..................................................... 180/219
(58) Field of Classification Search .................. 180/218, 180/219, 68.1, 68.3
See application file for complete search history.

(56) References Cited

U.S. PATENT DOCUMENTS 7,380,624 B2 * 6/2008 Momosaki .................. 180/68.3
2002/0050415 A1 * 5/2002 Kawamoto .................... 180/219
2008/0127915 A1 * 6/2008 Bilek et al. .................... 123/54.4

FOREIGN PATENT DOCUMENTS

JP 2006-123656 A 5/2006

* cited by examiner

*Primary Examiner* — Tony Winner
(74) *Attorney, Agent, or Firm* — Alleman Hall McCoy Russell & Tuttle LLP

(57) ABSTRACT

A straddle vehicle includes an engine; an air cleaner including an air cleaner box forming a passage through which air is supplied to the engine and an air filter for cleaning the air flowing through the passage; and a first electric component positioned laterally relative to the air cleaner box.

23 Claims, 16 Drawing Sheets

STRADDLE VEHICLE

CROSS REFERENCE TO RELATED APPLICATION

This application claims priority to and the benefit of Japanese Patent Application No. 2009-299198, filed Dec. 29, 2009, and Japanese Patent Application No. 2010-172525, filed Jul. 30, 2010, the entire disclosures of which are incorporated herein by reference.

BACKGROUND OF THE INVENTION

1. Field of the Invention

The present invention relates to a straddle vehicle including an engine, an air cleaner (including an air cleaner box) for cleaning air supplied to the engine and electric components electrically coupled to the engine.

2. Description of the Related Art

Conventionally, for straddle vehicles such as motorcycles, various techniques for arranging electric components (control unit, relay box, etc.) are studied. For example, Japanese Laid-Open Patent Application Publication No. 2006-123656 discloses a technique for mounting an electric component to an air cleaner forming an air-intake passage.

In this technique, since the electric component is mounted to an upper mounting seat surface of the air cleaner, a height of the air cleaner and the electric component is larger than a height of the air cleaner. Correspondingly, a fuel tank and the like disposed above the electric component and the air cleaner are inevitably disposed in a higher position. This reduces flexibility of an attitude of a driver mounting the motorcycle, during driving, etc.

SUMMARY OF THE INVENTION

The present invention addresses the above described conditions, and an object of the present invention is to provide a straddle vehicle which is capable of improving flexibility of the attitude of the driver mounting the motorcycle, during driving, etc.

According to an aspect of the present invention, a straddle vehicle comprises an engine; an air cleaner including an air cleaner box forming a passage through which air is supplied to the engine and an air filter for cleaning the air flowing through the passage; and a first electric component positioned laterally relative to the air cleaner box.

In accordance with this configuration, since the first electric component is positioned laterally relative to the air cleaner box, a height of the air cleaner and the first electric component does not increase, and therefore, a fuel tank and the like disposed above the air cleaner are made lower. As a result, it is possible to improve flexibility of the attitude of the driver mounting the motorcycle, during driving, etc.

As used herein, the term "laterally" is meant to include leftward, rightward, forward, rearward or an intermediate direction associated with these directions, but not to include above and below.

The straddle vehicle may further comprise a vehicle body frame positioned laterally relative to the air cleaner box; and at least a portion of the first electric component may be positioned right above the vehicle body frame.

In accordance with this configuration, since at least a portion of the first electric component is positioned right above the vehicle body frame, a space in which the air cleaner box is disposed is not limited by the first electric component, and as a result, a volume of the air cleaner box is not reduced.

The first electric component may be positioned laterally relative to the air cleaner box with a gap between the first electric component and the air cleaner box.

In accordance with this configuration, since heat generated in the first electric component can be radiated through the gap formed between the first electric component and the air cleaner box, the first electric component can be cooled more effectively.

The straddle vehicle may further comprise a support member provided to be apart from the air cleaner box and configured to support the first electric component.

In accordance with this configuration, since the support member for supporting the first electric component is provided to be apart from the air cleaner box, it is possible to prevent a vibration of the engine from being transmitted to the support member via the air cleaner box and to prevent the first electric component from vibrating.

The straddle vehicle may further comprise a cover configured to cover at least a portion of a side surface of the air cleaner box from outside in a vehicle width direction; and the support member may be provided at the cover.

In accordance with this configuration, since the support member provided at the cover supports the first electric component, the first electric component can be detached along with the cover when the air filter of the air cleaner is changed. Thus, changing of the air filter is easily performed.

The air cleaner box may be provided at a front portion thereof with an air inlet communicating with an air duct; the air cleaner box may be provided at a rear portion thereof with a plurality of air outlets respectively communicating with a plurality of combustion chambers provided in the engine; and the first electric component may be positioned laterally relative to the front portion of the air cleaner box.

In accordance with this configuration, since the air taken into the air cleaner box through the air inlet is delivered to the plurality of air outlets, a rightward and leftward dimension of the front portion of the air cleaner box can be made smaller than a rightward and leftward dimension of a rear portion of the air cleaner box. Therefore, a wide extra space is ensured laterally relative to the front portion of the air cleaner box and the first electric component is positioned in this extra space.

The straddle vehicle may further comprise a second electric component positioned laterally relative to the air cleaner box, and the first electric component may be electrically coupled to the second electric component via an electric wire.

In accordance with this configuration, since the second electric component is positioned laterally relative to the air cleaner box, and the first electric component is positioned laterally relative to the air cleaner box as described above, the fuel tank and the like disposed above the air cleaner are made lower, flexibility of an attitude of a driver mounting the motorcycle, is not reduced during driving, etc.

The first electric component may be positioned at one side of the air cleaner box in a rightward and leftward direction; and the second electric component may be positioned at the other side of the air cleaner box in the rightward and leftward direction.

In accordance with this configuration, since the first electric component is positioned at one side of the air cleaner box in the rightward and leftward direction; and the second electric component is positioned at the other side of the air cleaner box in the rightward and leftward direction, the passage inside the air cleaner box is not concentrated at the left side or the right side.

According to another aspect of the present invention, a straddle vehicle comprises an engine; an air cleaner including an air cleaner box forming a passage through which air is supplied to the engine and an air filter for cleaning the air; a fuel tank disposed above the air cleaner box and configured to store a fuel fed to the engine; and a control unit configured to control the engine; wherein the control unit is provided on a side surface of the air cleaner box.

In accordance with this configuration, since the control unit is provided on the side surface of the air cleaner box, the fuel tank can be disposed in a lower position by reducing a gap between the air cleaner box and the fuel tank disposed thereabove. Thus, flexibility of an attitude of a driver mounting the motorcycle is improved, during driving, etc. Since the air flows through the interior of air cleaner box, heat in a space surrounding the control unit can be radiated efficiently by the air.

The air cleaner box may be provided integrally with a control unit accommodating member configured to accommodate the control unit.

In accordance with this configuration, since the control unit accommodating member is provided integrally on the side surface of the air cleaner box, heat transmission between the inner surface of the air cleaner box and the inner surface of the control unit accommodating member can be performed efficiently, and thus, heat in a space surrounding the control unit can be radiated efficiently by the air flowing through the interior of the air cleaner box.

A wire harness may be guided from the control unit in a downward direction toward the air cleaner box; and the wire harness may include an electric wire electrically coupling the control unit to the engine.

The wire harness consists of a bundle of a plurality of electric wires. Therefore, it is difficult to curve the harness freely, and there is a limitation on a curvature of the harness in wiring in a curved form. For this reason, in the conventional arrangement in which the control unit is disposed on the upper surface of the air cleaner box as described above, if an attempt is made to guide the wire harness from the control unit to a location below the air cleaner box, flexible design is difficult because unnatural wiring must be avoided. In contrast, in the above arrangement, since the control unit is positioned at the side surface of the air cleaner box, the wire harness can be guided smoothly to a location below the air cleaner box.

The control unit may include a unit body containing electronic components; and the unit body may be accommodated into the anti-vibration case.

In accordance with this configuration, since the anti-vibration case can absorb the vibration which would be transmitted to the unit body, the electric component of the unit body can be protected from the vibration.

A protrusion may be provided on at least one of an outer surface of the anti-vibration case and an inner surface of the control unit accommodating member and is configured to contact the other of the outer surface of the anti-vibration case and the inner surface of the control unit accommodating member.

In accordance with this configuration, since the protrusion is located in a gap between the outer surface of the anti-vibration case and the inner surface of the control unit accommodating member, it is possible to fasten the anti-vibration case in the interior of the control unit accommodating member. As a result, a vibration of the anti-vibration case itself is suppressed, and a vibration which would be transmitted to the unit body can be absorbed more effectively. When the anti-vibration case is inserted into the control unit accommodating member, a contact area of the control unit accommodating member and the anti-vibration case can be reduced because of the presence of the protrusion. Therefore, an operation for inserting the anti-vibration case into the control unit accommodating member can be easily carried out with a reduced insertion resistance.

A connector may be provided at an end portion of the wire harness. The control unit may have a coupling member to which the connector is coupled; and the connector coupled to the coupling member may be covered with a connector cover.

In accordance with this configuration, since the connector is covered with the connector cover, the connector cannot be easily detached from the coupling member and thus, it is difficult to detach the control unit. As a result, a theft can be prevented effectively.

The connector or the control unit may include a disengagement portion configured to provide disengagement between the connector and the control unit; and the disengagement portion may be covered with the connector cover.

In accordance with this configuration, since the disengagement portion is covered with the connector cover, it is difficult to detach the control unit. As a result, a theft can be prevented more effectively.

The anti-vibration case and the connector cover may be integral with each other to form a control unit case.

In accordance with this configuration, the anti-vibration case and the connector cover are easily formed of the same material.

The control unit accommodating member may cover a portion of the connector cover which covers the disengagement portion.

In accordance with this configuration, since the disengagement portion is covered with the control unit accommodating member in addition to the connector cover, a theft can be prevented more effectively.

The control unit accommodating member may be provided on an inner surface thereof with a displacement inhibiting portion or a displacement inhibiting member configured to stop the connector cover to inhibit the connector cover from being displaced.

In accordance with this configuration, since the displacement inhibiting portion or the displacement inhibiting member provided on the inner surface of the control unit accommodating member can inhibit the connector cover from being displaced, it is possible to prevent the connector cover from disengaging from the control unit accommodating member.

The control unit accommodating member may have at a lower end portion thereof, an insertion opening through which the control unit is inserted into the control unit accommodating member.

In accordance with this configuration, since the wire harness can be drawn out through the insertion opening formed on the lower end portion of the control unit accommodating member, the wire harness can be guided smoothly to a location below the air cleaner box.

The anti-vibration case may be inserted into the control unit accommodating member through the insertion opening along with the control unit; and the anti-vibration case may be provided on an outer surface thereof with a groove extending in a direction in which the control unit is inserted into the control unit accommodating member, the displacement inhibiting portion being configured to pass through the groove when the control unit is inserted into the control unit accommodating member.

In accordance with this configuration, since the displacement inhibiting portion is allowed to pass through the groove formed on the outer surface of the anti-vibration case, a friction resistance between the anti-vibration case and the displacement inhibiting portion can be reduced. This makes it easy to perform an operation for inserting the anti-vibration case into the control unit accommodating member.

The straddle vehicle may further comprise a frame to which the engine is mounted; and the insertion opening may be positioned below an upper end portion of a portion of the frame which is located in close proximity to the insertion opening of the control unit accommodating member.

In accordance with this configuration, the frame serves to inhibit a thief from accessing the control unit through the insertion opening.

The control unit accommodating member may be provided at an upper end portion thereof with an insertion opening through which the control unit is inserted into the control unit accommodating member, and the insertion opening is covered with the fuel tank.

In accordance with this configuration, the fuel tank serves to inhibit a thief from accessing the control unit through the insertion opening.

The engine may include a plurality of combustion chambers configured to combust a fuel fed from the fuel tank, valve mechanisms provided to respectively correspond to the plurality of combustion chambers, a cam mechanism configured to open and close each of the valve mechanisms, a driving power transmission mechanism configured to transmit a driving power to the cam mechanism, and a driving power transmission mechanism accommodating section provided at one side in a combustion chamber line direction in which each of the plurality of combustion chambers are aligned and configured to accommodate the driving power transmission mechanism; the air cleaner box may be disposed above the engine; a space where the passage of the air cleaner box is not present may be provided above the driving power transmission mechanism accommodating section; and at least a portion of the control unit may be disposed in the space where the passage is not present.

In a case where the air cleaner box is disposed above the engine, it is reasonable to arrange the air passage above the plurality of combustion chambers, and a relatively wide space where the air passage is not present is ensured above the driving power transmission mechanism accommodating section provided at one side in the direction in which the combustion chambers are aligned. In accordance with the above configuration, at least a portion of the control unit is disposed in this space efficiently.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings. The stated directions are referenced from the perspective of a driver straddling a motorcycle (straddle vehicle) and a rightward and leftward direction conforms to a width direction of a vehicle body of the motorcycle, unless otherwise explicitly noted.

(Embodiment 1)

[Construction of Motorcycle]

Figure 1:
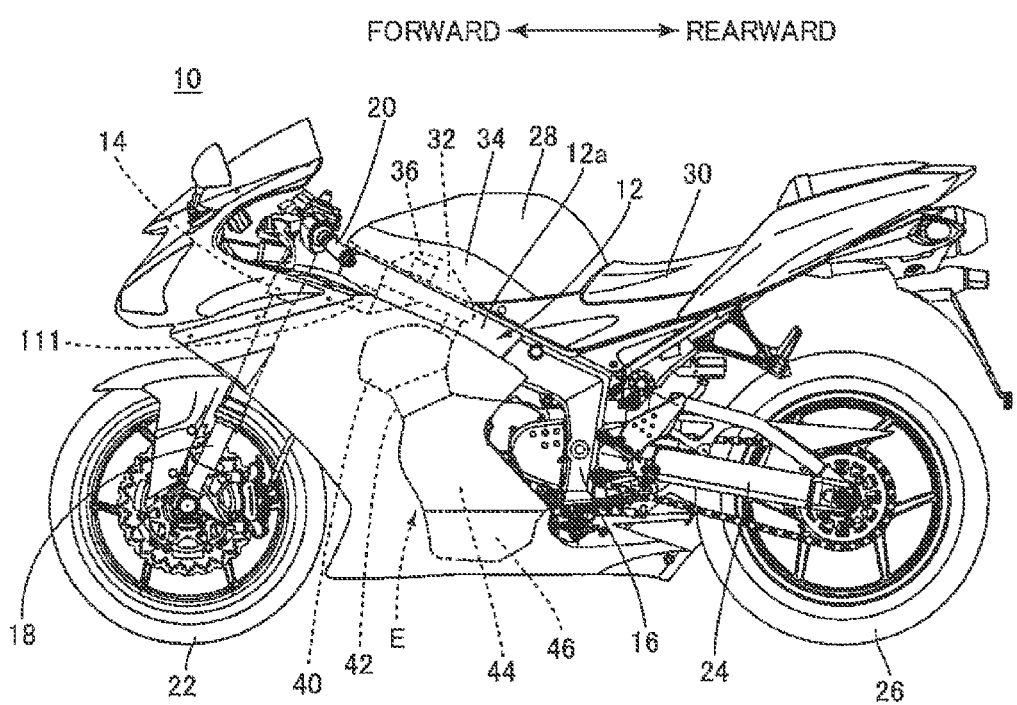
FIG. 1 is a left side view showing a construction of an entire motorcycle (straddle vehicle) according to Embodiment 1.
Figure 2:
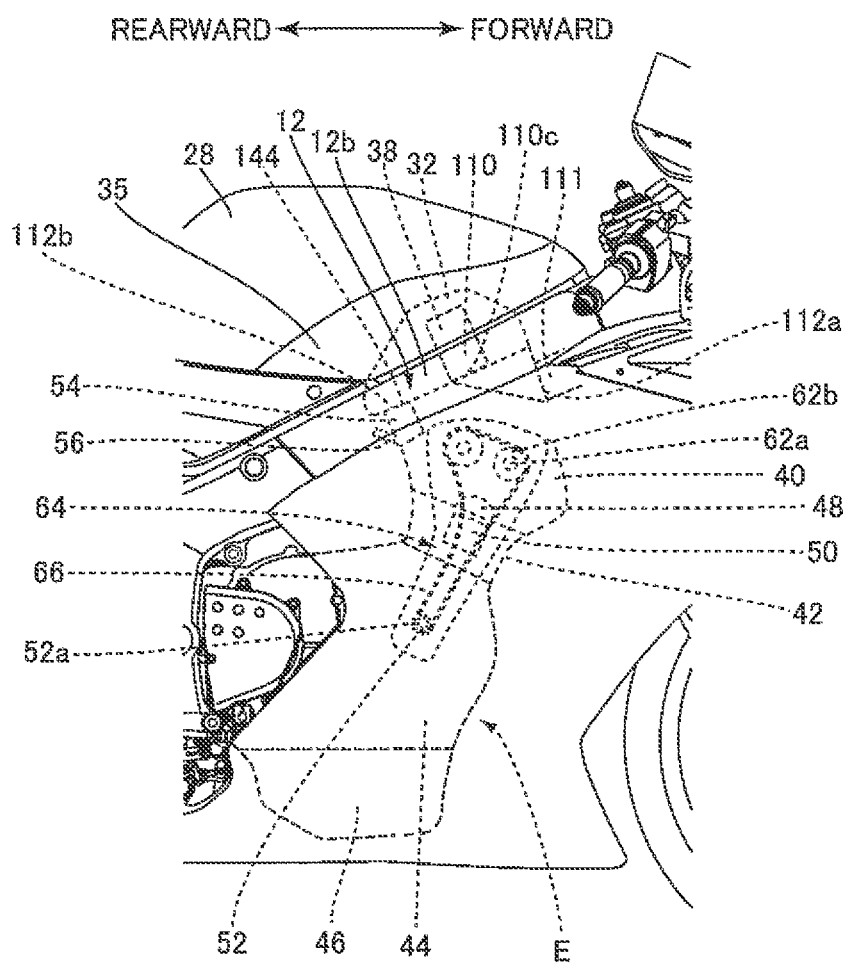
FIG. 2 is an enlarged right side view showing a configuration of an engine E in the motorcycle according to Embodiment 1.
Figure 3:
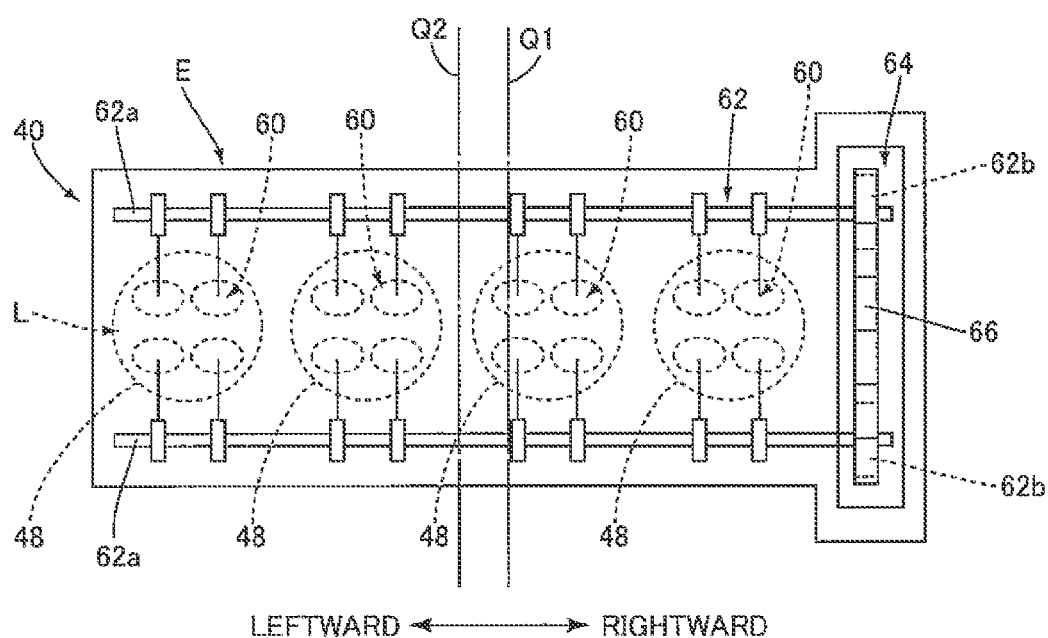
FIG. 3 is a plan view schematically showing an internal structure of a cylinder head, in the motorcycle according to Embodiment 1.
Figure 4:
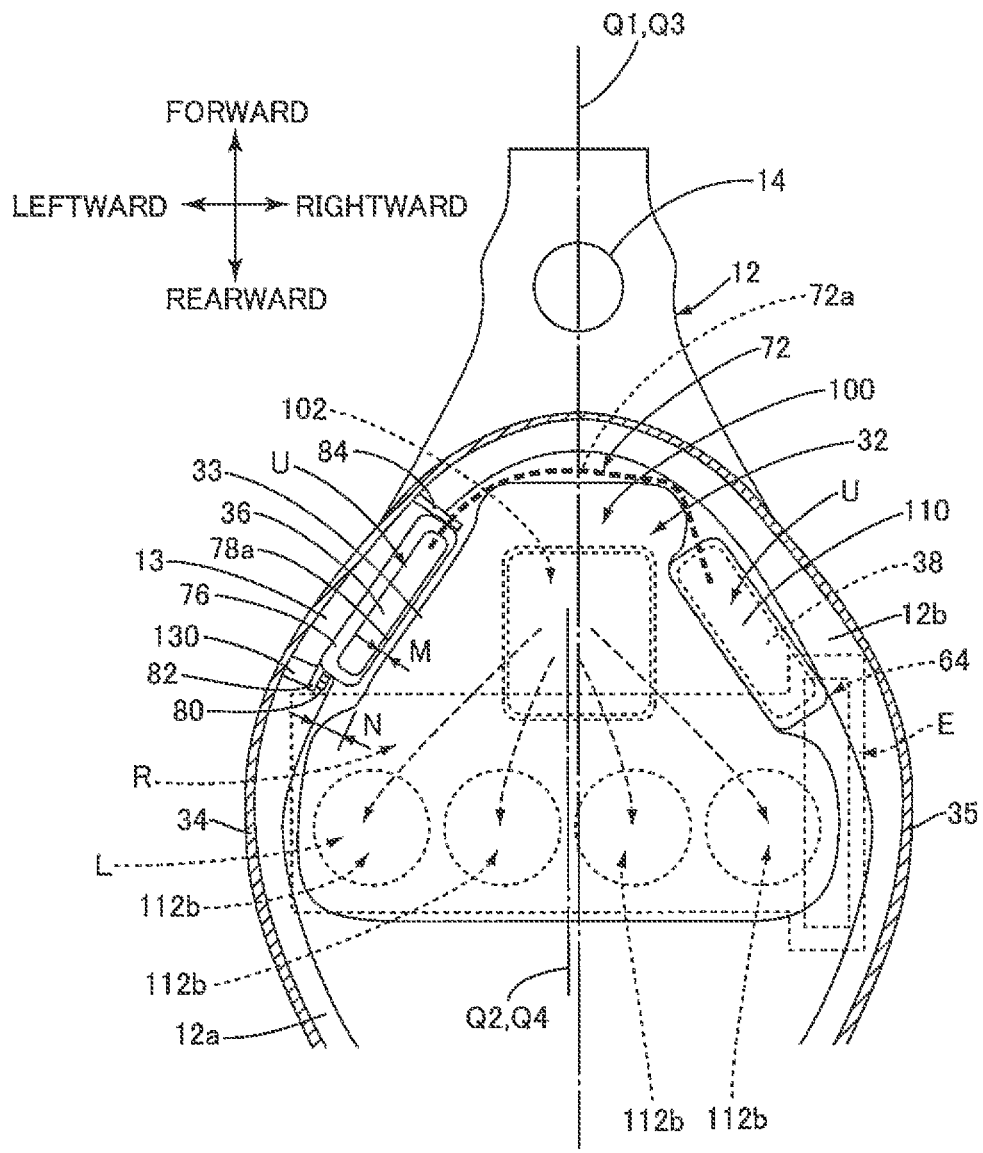
FIG. 4 is a plan view schematically showing a positional relationship between an air cleaner, a relay box (first electric component) and a control unit (second electric component).

FIG. 1 is a left side view of a construction of an entire motorcycle 10 which is a straddle vehicle according to Embodiment 1. FIG. 2 is an enlarged right side view showing a configuration of an engine E. FIG. 3 is a plan view schematically showing an internal structure of a cylinder head 40, in the motorcycle 10. FIG. 4 is a plan view schematically showing a positional relationship between an air cleaner 32, a relay box 36, and a control unit 38 in the motorcycle 10.

Referring to FIG. 1, the motorcycle 10 includes a frame 12, a head pipe 14 provided at a front portion of the frame 12, and a pair of right and left pivot frames 16 provided at a rear portion of the frame 12. A steering shaft (not shown) is rotatably inserted into the head pipe 14. A front fork 18 and a handle 20 are attached to the steering shaft. A front wheel 22 is mounted to a lower end portion of the front fork 18. A pair of right and left swing arms 24 is attached to the pivot frames 16, respectively. A rear wheel 26 is mounted to rear end portions of the swing arms 24. An engine E is mounted to the frame 12. A fuel tank 28 and a seat 30 are arranged above the engine E such that the fuel tank 28 is forward relative to the seat 30. An air cleaner 32 is disposed above the engine E and below the fuel tank 28.

As shown in FIGS. 1 and 2, a first cover 34 and a second cover 35 are provided above the frame 12 to cover the air cleaner 32 from both sides in the width direction of the motorcycle 10. Between the air cleaner 32 and the first cover 34, the relay box 36 which is a first electric component is disposed, while between the air cleaner 32 and the second cover 35, the control unit 38 (ECU: electric control unit), which is a second electric component, is disposed.

As shown in FIG. 4, the frame 12 of this embodiment includes an enlarged portion 13 having a dimension in the rightward and leftward direction which increases in a direction from forward to rearward. The air cleaner 32 includes an enlarged portion 33 having a dimension in the rightward and leftward direction which increases in a direction from forward to rearward, inward relative to the frame 12. The relay box 36 is positioned above the enlarged portion 13 of the frame 12 and laterally relative to the enlarged portion 33 of the air cleaner 32.

[Configuration of Engine]

Referring to FIG. 2, the engine E includes the cylinder head 40, a cylinder block 42, a crankcase 44 and an oil pan 46. Inside the cylinder head 40, a plurality of (in this embodiment, four) combustion chambers 48 is formed to combust a fuel fed from the fuel tank 28. Inside the cylinder block 42, a plurality of cylinders (not shown) and a plurality of pistons 50 respectively corresponding to the four combustion chambers 48 are disposed. Inside the crankcase 44, a crankshaft 52 driven to rotate by a reciprocating operation of the piston 50 is accommodated. In the vicinity of the cylinder head 40, a throttle device 54 is disposed. An outlet of the throttle device 54 is coupled to an intake port of each of the combustion chambers 48, while an inlet of the throttle device 54 is coupled to each of air outlets 112b (see FIG. 4) of the air cleaner 32 via a duct (not shown). At a side portion of the throttle device 54, an injector 56 for injecting a fuel is provided.

As shown in FIG. 3, inside the cylinder head 40, each of the plurality of combustion chambers 48 are aligned in the rightward and leftward direction to form a combustion chamber line L. A valve mechanism 60 is provided for each of the plurality of combustion chambers 48. A cam mechanism 62 is provided above the combustion chambers 48 to open and close the valve mechanisms 60. The cam mechanism 62 includes two camshafts 62a. A sprocket 62b is mounted on one end portion of each camshaft 62a. A cam chain tunnel 64 which is a driving power transmission mechanism accommodating section is provided at one side (right side in this embodiment) in the direction of the combustion chamber line L, to extend vertically. Inside the cam chain tunnel 64, a cam chain 66 (driving power transmission mechanism) for transmitting a rotational force of the crankshaft 52 (see FIG. 2) to the camshafts 62a is accommodated. The cam chain 66 is installed around a sprocket 52a (FIG. 2) mounted on the crankshaft 52 and the sprockets 62b mounted on the camshafts 62a. Therefore, when the engine E is viewed from above, a center line Q1 extending forward and rearward through the center portion of the engine E in the rightward and leftward direction is closer to the cam chain tunnel 64 than a center line Q2 of the combustion chamber line L. In this embodiment, the center line Q1 is rightward relative to the center line Q2.

As shown in FIG. 4, the frame member 12 includes a pair of right and left frame members 12a and 12b. The frame members 12a and 12b are closer to each other in the vicinity of the head pipe 14 and are apart from each other in the enlarged portion 13. The engine E is disposed below the frame members 12a and 12b such that the center line Q1 substantially conforms to a center line Q3 of the frame member 12 or slightly deviates from the center line Q3. Therefore, when the engine E is viewed from above, the center line Q2 of the combustion chamber line L is closer to an opposite side of the cam chain tunnel 64 than the center line Q3 of the frame member 12. That is, the center line Q2 of the combustion chamber line L is leftward relative to the center line Q3 of the frame 12.

Although the cam chain 66 is used as the driving power transmission mechanism in this embodiment, the driving power transmission mechanism is not limited to a chain-type, but a bevel gear type or a gear train type may be used. In this case, the driving power transmission mechanism accommodating section may be altered to be combustible with the type of the driving power transmission mechanism. Furthermore, the type of the frame 12 is not particularly limited, but a twin-tube frame, a monocoque frame, etc. may be used.

[Configuration of Relay Box]

Figure 5A:
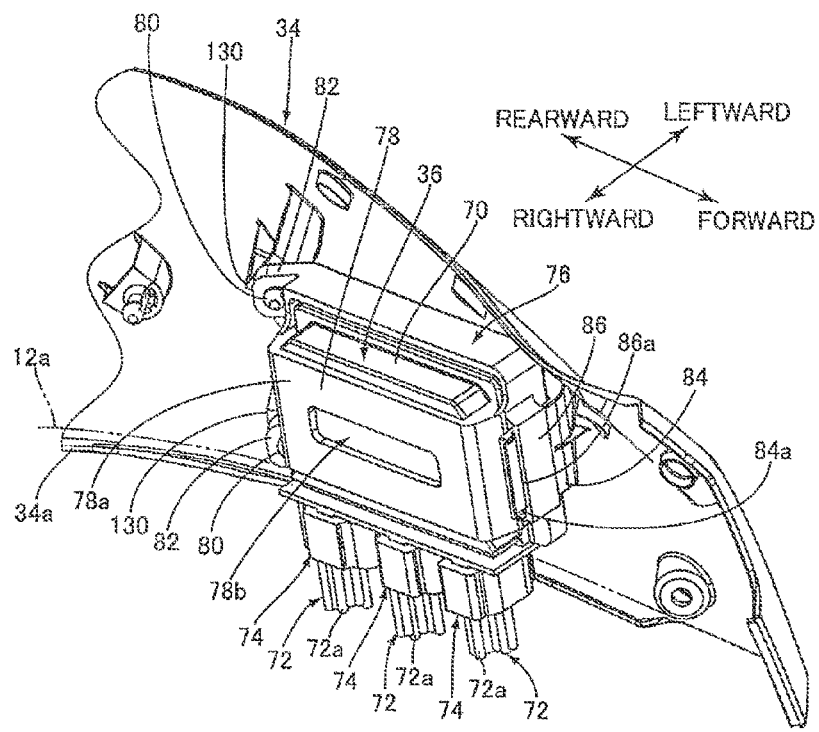
FIG. 5A is a perspective view showing a mounting structure of the relay box (first electric component) with respect to a cover, as viewed from rightward and forward.
Figure 5B:
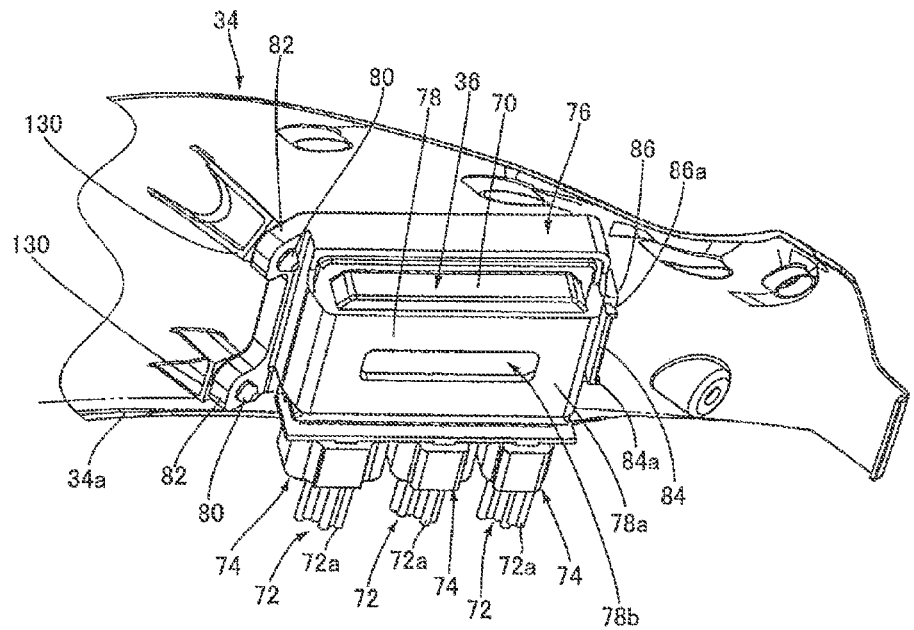
FIG. 5B is a perspective view showing a mounting structure of the relay box (first electric component) with respect to the cover, as viewed from rightward and rearward.

FIGS. 5A and 5B are perspective views showing a mounting structure of the relay box 36 with respect to the first cover 34.

Referring to FIGS. 5A and 5B, the relay box 36 is electrically coupled to the control unit 38 (FIG. 4) and electric components (e.g., actuator) and is configured to operate in accordance with a control signal received from outside to turn ON and OFF an external load. The relay box 36 includes a box-like casing 70, a wiring board (not shown) accommodated in the casing 70, and relays (not shown) mounted on the wiring board. Connectors 74 of wire harnesses 72 are detachably coupled to terminals provided on the wiring board, respectively. The relay box 36 accommodated into the relay box case 76 is attached to an inner surface of the first cover 34.

As shown in FIGS. 5A and 5B, the relay box case 76 is a support member configured to support the relay box 36 on the inner surface of the first cover 34, and includes a case body 78 formed of a rubber elastic material such as rubber or elastomer. The case body 78 has an internal space for accommodating the relay box 36. An air window 78b is formed on at least one side wall 78a of the case body 78 which is opposite to the air cleaner box 100 to radiate heat from the relay box 36. Fastening portions 82 are provided at one end portion (in this embodiment, rear end portion) of the case body 78 in a width direction thereof and have through-holes (not shown) into which fastener screws 80 are inserted, respectively. In addition, an engagement portion 86 having a slit 86a is formed at an opposite end portion (in this embodiment, front end portion) of the case body 78 in the width direction. A fastener belt 84 is inserted into the slit 86a and engaged therewith.

[Configuration of Control Unit]

Figure 6:
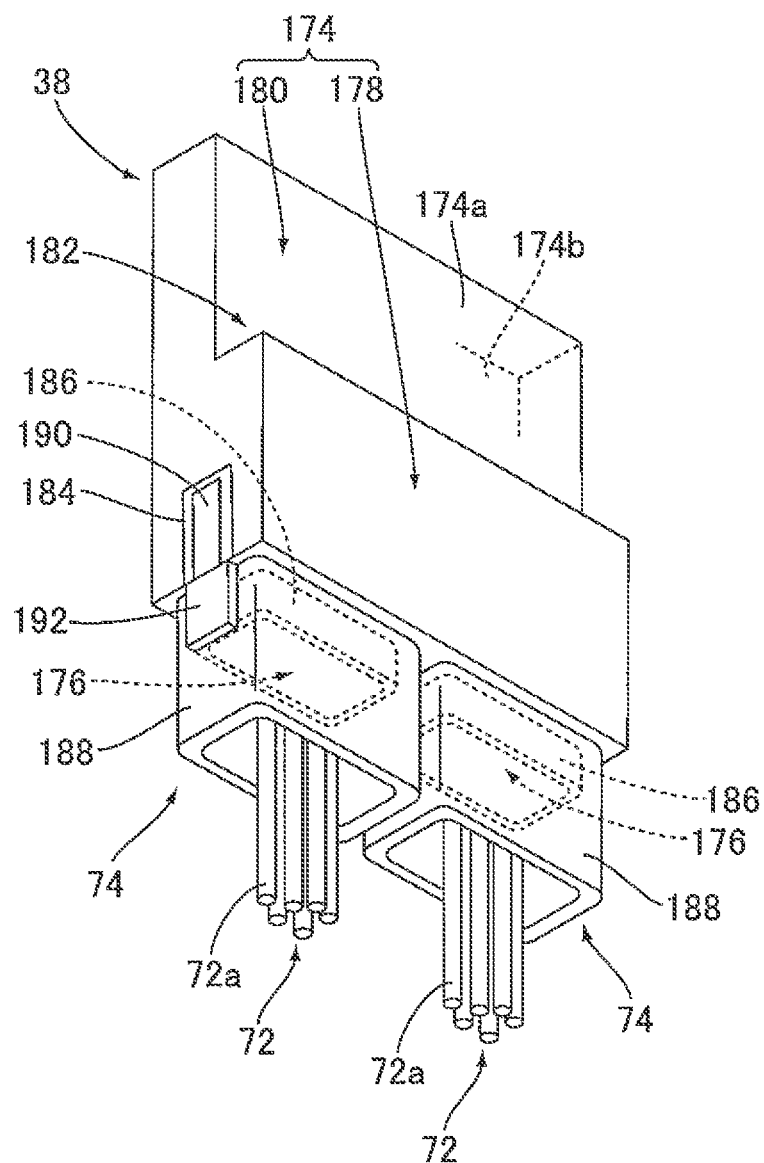
FIG. 6 is a perspective view showing a configuration of a control unit and connectors in the motorcycle according to Embodiment 1.

FIG. 6 is a perspective view showing a configuration of the control unit 38 and the connectors 74 in the motorcycle 10.

Figure 8:
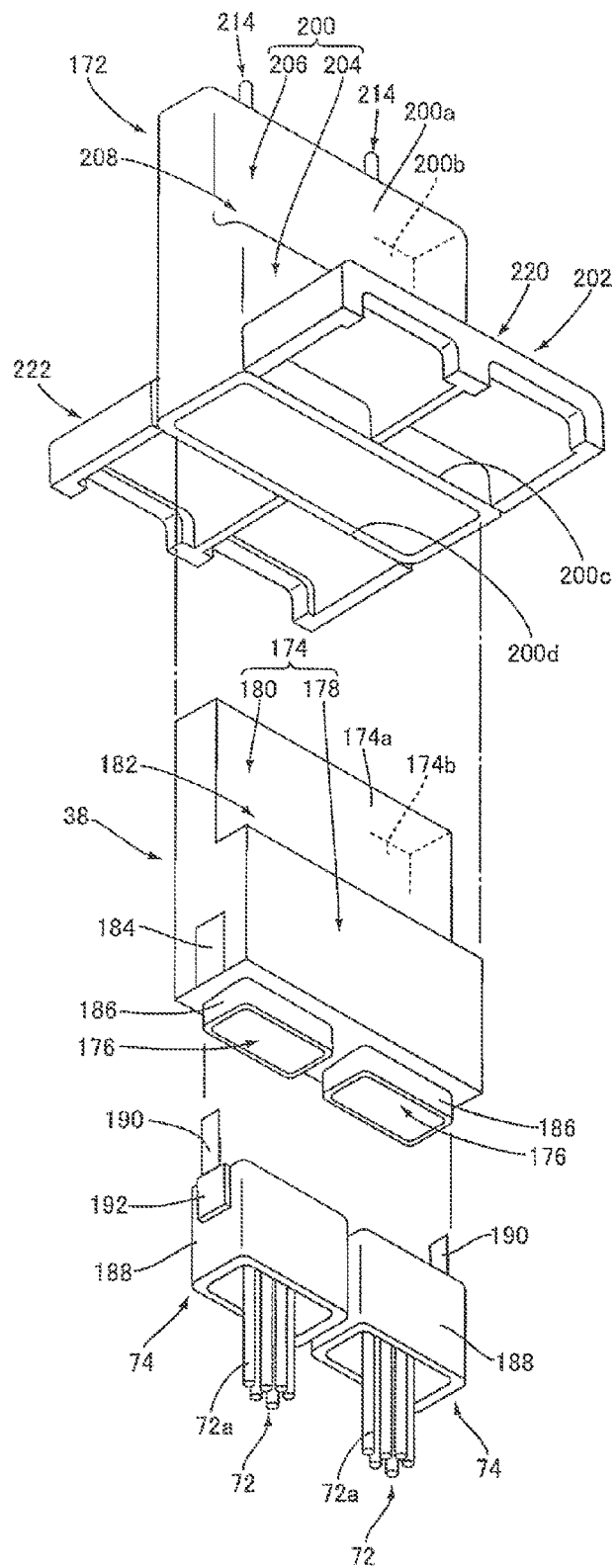
FIG. 8 is a perspective view showing a step of accommodating the control unit into the control unit case (anti-vibration case and connector cover).

FIG. 8 is a perspective view showing a step of accommodating the control unit 38 into the control unit case 172.

Referring to FIGS. 6 and 8, the control unit 38 is configured to control the operation of the engine E and the operation of other devices based on signals received from sensors (not shown) such as a crank angle sensor, a throttle valve opening degree sensor, a transmission gear position sensor, an air-intake pressure sensor, a temperature sensor, etc., the relay box 36 and other electric components, and includes a unit body 174 containing a CPU, a ROM, a RAM, etc., and two coupling members 176 to which the connectors 74 are coupled, respectively.

The unit body 174 includes a first plate portion 178 of a substantially rectangular shape and a second plate portion 180 of a substantially rectangular shape which is located above the first plate portion 178. The two coupling members 176 are arranged in the rightward and leftward direction on a lower end surface of the first plate portion 178. The first plate portion 178 has a thickness larger than a thickness of the second plate portion 180. As a result, the unit body 174 has a stepped portion 182 between the first plate portion 178 and the second plate portion 180 on a first surface 174*a* at one side in the thickness direction thereof. In contrast, on a second surface 174*b* of the unit body 174 at an opposite side in the thickness direction, the first plate portion 178 and the second plate portion 180 are flat and continuous the without a level difference. The second surface 174*b* faces the air cleaner 32. First engagement portions 184 are formed at both end surfaces of the lower end portion of the first plate portion 178 in the width direction such that the first engagement portions 184 are engageable with second engagement portions 190 as described later, respectively.

Each coupling member 176 has a fitting protrusion 186 to which the corresponding connector 74 is fitted. A plurality of first terminals (not shown) are provided inside each fitting protrusion 186 and are electrically coupled to electronic components of the unit body 174.

Each connector 74 has an end portion cover 188 for covering an end portion of the wire harness 72 consisting of a bundle of a plurality of electric wires 72*a*. A fitting portion (not shown) fitted to the fitting protrusion 186 of the coupling member 176 is formed at a tip end portion of the end portion cover 188. Inside the end portion cover 188, a plurality of second terminals (not shown) are provided and are electrically coupled to the plurality of electric wires 72*a*, respectively. The second engagement portion 190 which is engageable with the first engagement portion 184, and a disengagement portion 192 configured to disengage the second engagement portion 190 from the first engagement portion 184 are formed on one end surface of each end portion cover 188 in the width direction.

Referring to FIG. 8, to couple each connector 74 to the control unit 38, the fitting portion formed at the end portion cover 188 is fitted to the fitting protrusion 186 of the corresponding coupling member 176. Thereby, the first terminals provided inside the fitting protrusion 186 are coupled to the second terminals provided inside the corresponding end portion cover 188, and the second engagement portion 190 is engaged with the first engagement portion 184 to prevent the connector 74 from being disengaged from the control unit 38. When the connector 74 is detached from the control unit 38, the disengagement portion 192 is pressed by a finger or a tool to disengage the second engagement portion 190 from the first engagement portion 184. Then, the connector 74 is moved away from the coupling member 176 while maintaining their disengagement state.

A disengaging method of the disengagement portion 192 is not particularly limited, but "rotation method" for rotating the engagement portion, etc., may be used, instead of "pressing method" in this embodiment. The disengagement portion 192 is not necessarily provided on the connector 74 but may be provided on the unit body 174 or the coupling member 176 of the control unit 38.

[Configuration of Control Unit Case]

Figure 7:
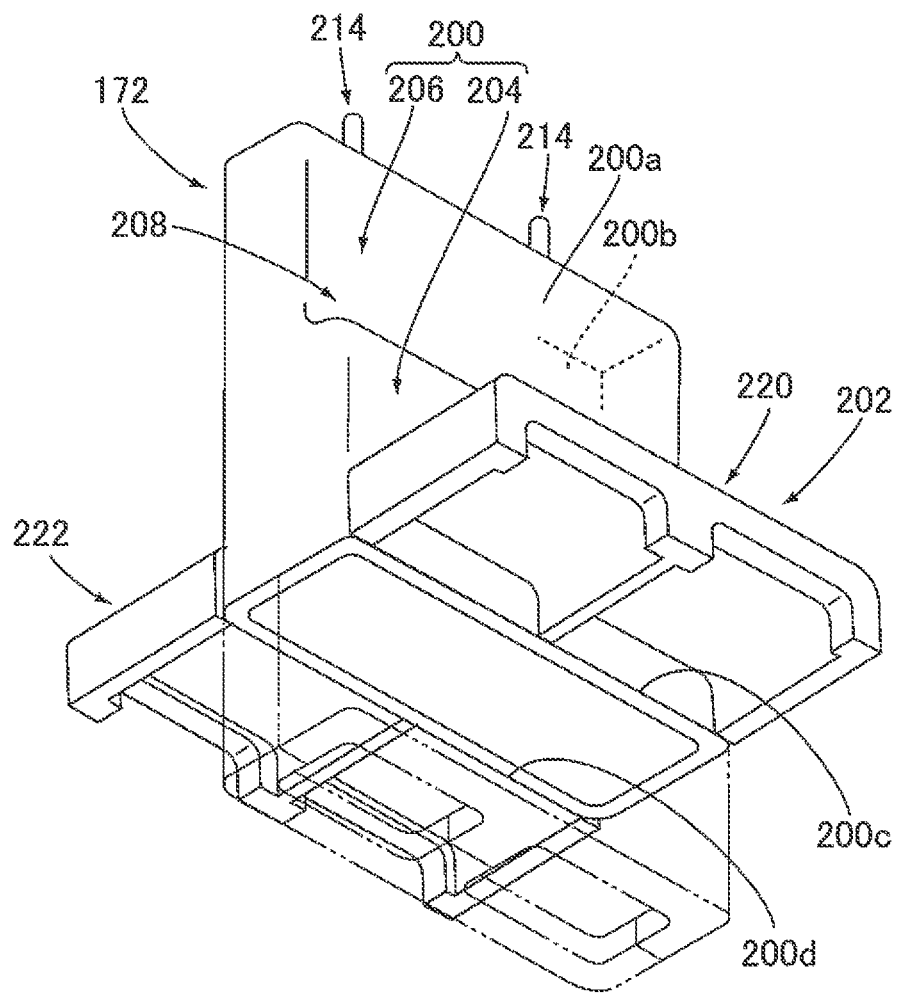
FIG. 7 is a perspective view showing a configuration of a control unit case (anti-vibration case and connector cover) in the motorcycle according to Embodiment 1.

FIG. 7 is a perspective view showing a configuration of a control unit case 172. FIG. 8 is a perspective view showing a step of accommodating the control unit 38 into the control unit case 172.

Referring to FIGS. 7 and 8, the control unit case 172 is configured to accommodate the control unit 38 and the connectors 74. The control unit case 172 includes an anti-vibration case 200 for accommodating the unit body 174 of the control unit 38 and a connector cover 202 for accommodating the connectors 74. In this embodiment, the anti-vibration case 200 and the connector cover 202 are formed integrally of an elastic material such as rubber or elastomer.

The anti-vibration case 200 is configured to accommodate the unit body 174 without a clearance to protect the electronic components (not shown) accommodated into the unit body 174, from vibration, for example. In this embodiment, since the unit body 174 (FIG. 6) includes the first plate portion 178 of a substantially rectangular shape and the second plate portion 180 of a substantially rectangular shape, the anti-vibration case 200 includes a box-like first portion 204 of a substantially rectangular shape, for accommodating the first plate portion 178, and a box-like second portion 206 of a substantially rectangular shape for accommodating the second plate portion 180. A first surface 200*a* of the anti-vibration case 200 which is at one side in a thickness direction thereof has a stepped portion 208 between the first portion 204 and the second portion 206. In contrast, on a second surface 200*b* of the anti-vibration case 200 which is at an opposite side in the thickness direction thereof, the first portion 204 and the second portion 206 are flat and continuous without a level difference. The second surface 200*b* faces the air cleaner 32. On an upper end surface of the control unit case 172, i.e., an upper surface of the anti-vibration case 200, at least one engagement protrusion 214 protrudes upward and is engageable with an engagement hole 112 (FIG. 11) of the control unit accommodating member 110 (as described later).

Figure 9:
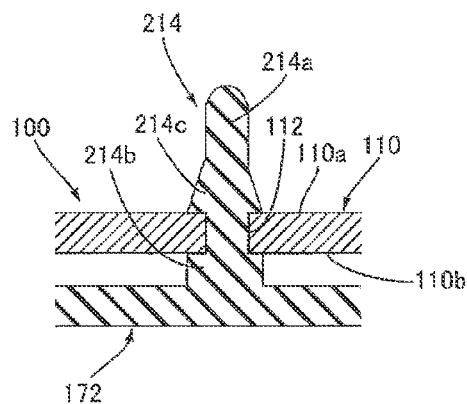
FIG. 9 is a cross-sectional view showing an engagement structure of an engagement protrusion and an engagement hole.

FIG. 9 is a cross-sectional view showing an engagement structure of the engagement protrusion 214 and the engagement hole 112. Referring to FIG. 9, the engagement protrusion 214 includes a protruding portion 214*a* which is inserted into the engagement hole 112 of the control unit accommodating member 110 and protrudes upward from the upper surface 110*a* of the control unit accommodating member 110, a contact portion 214*b* which is formed at a base end portion of the protruding portion 214*a* and is configured to contact an upper end portion inner surface 110*b* of the control unit accommodating member 110, and an engagement portion 214*c* which is formed at an outer peripheral portion of a center portion of the protruding portion 214*a* in a longitudinal direction and is engageable with the upper surface 110*a*. The protruding portion 214*a* has an outer diameter which is equal to or smaller than an inner diameter of the engagement hole 112 such that the protruding portion 214*a* is easily inserted into the engagement hole 112. The contact portion 214*b* has an outer diameter larger than an inner diameter of the engagement hole 112 such that the contact portion 214*b* contacts the upper end portion inner surface 110*b*. A lower end portion of the engagement portion 214*c* has an outer diameter larger than an inner diameter of the engagement hole 112 such that the engagement portion 214c is engageable with the upper surface 110a. The engagement portion 214c has a tapered outer peripheral surface which decreases in diameter in a direction toward the tip end of the protruding portion 214a so that the engagement portion 214c is easily inserted into the engagement hole 112.

Referring to FIGS. 7 and 8, the connector cover 202 is configured to cover the two connectors 74 coupled to the coupling members 176 of the control unit 38, and includes a first cover portion 220 and a second cover portion 222 which are formed by dividing a tubular body member of a substantially rectangular shape along a plane parallel to an axis of the tubular member. The first cover portion 220 is coupled to the anti-vibration case 200 at an edge 200c of a lower end portion of the anti-vibration case 200 which is at the first surface 200a side, while the second cover portion 222 is coupled to the anti-vibration case 200 at an edge 200d of the lower end portion of the anti-vibration case 200 which is at the second surface 200b side. In this structure, the first cover portion 220 is pivoted around the edge 200c to be opened and closed, while the second cover portion 222 is pivoted around the edge 200d to be opened and closed. Therefore, when the control unit 38 is removably attached to the anti-vibration case 200 or the connectors 74 are removably attached to the coupling members 176 of the control unit 38 accommodated into the anti-vibration case 200, the first cover portion 220 and the second cover portion 222 are opened as shown in FIG. 7 to move the connector cover 202 to a location where attachment and removal of the control unit 38 and the connectors 74 are easily and efficiently carried out.

As shown in FIG. 4, the control unit 38 is electrically coupled to the relay box 36 and the electric components (injector 56, ignition plug of the igniter, a drive motor of a throttle valve, etc.) via the electric wires 72a constituting the wire harnesses 72. Although in this embodiment, the anti-vibration case 200 is provided integrally with the connector cover 202, they may be formed as separate members. In that case, the connector cover 202 may be formed of a material different from the rubber elastic material.

[Configuration of Air Cleaner]

Figure 10:
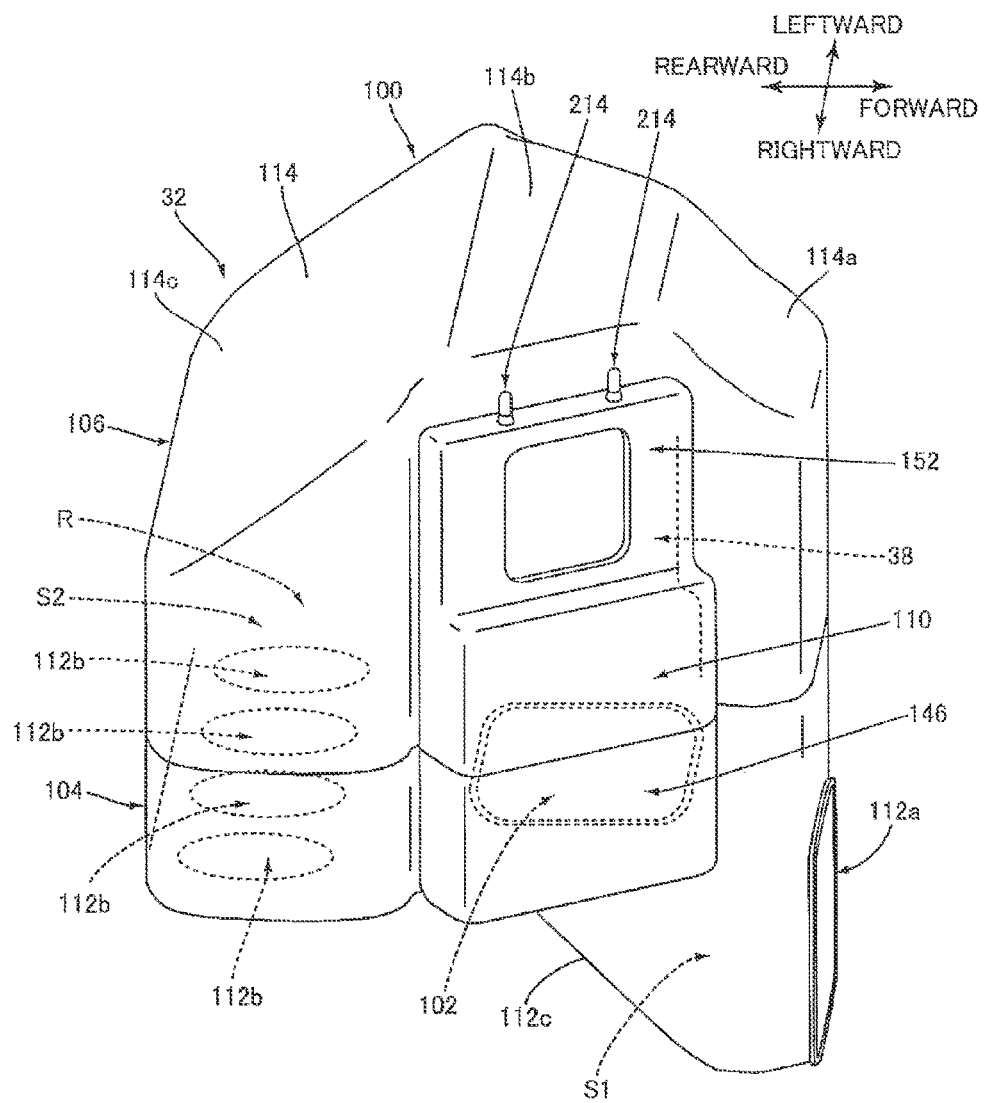
FIG. 10 is a perspective view showing a configuration of the air cleaner in the motorcycle according to Embodiment 1.
Figure 11A:
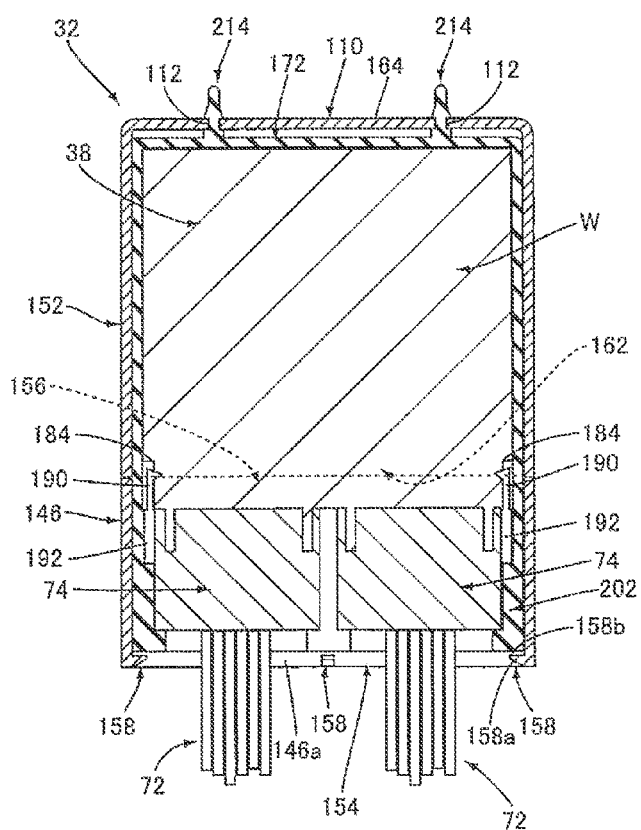
FIG. 11A is a cross-sectional view showing a mounting structure of the control unit with respect to the air cleaner, taken along a plane parallel to a front surface of the control unit.
Figure 11B:
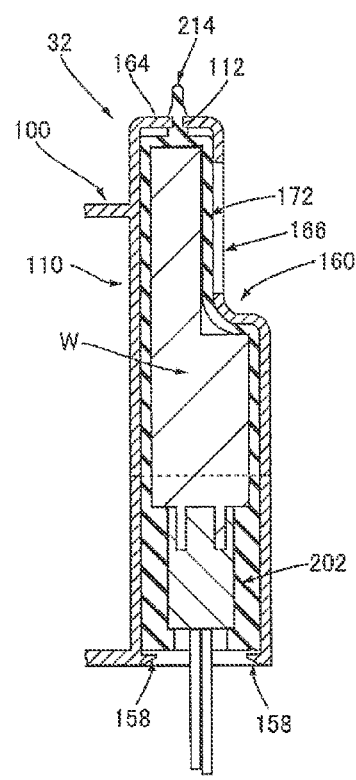
FIG. 11B is a cross-sectional view showing the mounting structure of the control unit with respect to the air cleaner, taken along a plane parallel to a side surface of the control unit.

FIG. 10 is a perspective view showing a configuration of the air cleaner 32. FIG. 11A is a cross-sectional view showing a mounting structure of the control unit 38 with respect to the air cleaner 32, taken along a plane parallel to a front surface of the control unit 38. FIG. 11B is a cross-sectional view showing the mounting structure of the control unit 38 with respect to the air cleaner 32, taken along a plane parallel to a side surface of the control unit 38.

Referring to FIG. 10, the air cleaner 32 includes the air cleaner box 100 constituting a passage R of air (ram air) supplied to the engine E, and an air filter 102 for cleaning the air flowing through the passage R. The air cleaner box 100 includes a lower case 104 and an upper case 106 which are formed of synthetic resin or the like. The lower case 104 and the upper case 106 are joined to each other by a joint member (not shown) such as a bolt to form the air cleaner box 100. The control unit accommodating member 110 for accommodating the control unit 38 is provided on an outer surface of front portions of the lower case 104 and the upper case 106, which is at a side (in this case, right side) where the cam chain tunnel 64 (FIG. 4) is located.

The lower case 104 constitutes a lower portion of the air cleaner box 100. The air inlet 112a is open in a forward direction at a front portion of the lower case 104 and is coupled to the air-intake duct 111 (FIGS. 1 and 2). Each of the plurality of (in this embodiment, four) air outlets 112b are open in a downward direction at a rear portion of the lower case 104 and are coupled to the plurality of combustion chambers 48 (FIGS. 2 and 3), respectively, via the throttle device 54 and others. A guide portion 112c is formed at a lower portion of the lower case 104 such that the guide portion 112c is tilted to guide the air taken into the passage R through the air inlet 112a to the air outlet 112b. A space Si is formed inside the guide portion 112c to guide, in an upward direction, the air flowing into the air passage R through the air inlet 112a.

The upper case 106 constitutes an upper portion of the air cleaner box 100. As shown in FIG. 10, a height of an upper wall portion 114 of the upper case 106 increases from a front end portion 114a toward a center portion 114b and decreases from the center portion 114b toward a rear end portion 114c. The upper wall portion 114 has a width (dimension in rightward and leftward direction) which gradually increases from the front end portion 114a toward the rear end portion 114c. Although not shown, a plurality of fuel feed members is provided at the rear end portion 114c of the upper wall portion 114 to respectively correspond to the plurality of air outlets 112b to feed a fuel to an inner space S2 of the upper case 106. Therefore, when the air is taken into the passage R through the air inlet 112a, the air is delivered to the plurality of air outlets 112b through the guide portion 112c and the upper wall portion 114, and in the space S2, the air and the fuel are mixed.

As shown in FIG. 10, the air filter 102 is removably attached to the inner surface of the lower case 104 to extend transversely in a downstream portion of the space S1 forming the passage R. Thereby, the inner space of the air cleaner box 100 is separated into a dirty side located upstream of the air filter 102 and a clean side located downstream of the air filter 102.

As shown in FIGS. 10 and 11, the control unit accommodating member 110 includes a lower accommodating portion 146 and an upper accommodating portion 152 which are joined to each other. As shown in FIG. 11, the lower accommodating portion 146 is configured to accommodate the connectors 74 and a lower portion (in this embodiment, connector cover 202) of the control unit case 172 accommodating the connectors 74. An inner peripheral surface of the lower accommodating portion 146 has the same shape (in this embodiment, rectangular shape) as that of the outer peripheral surface of the lower portion of the control unit case 172 without a clearance. The insertion opening 154 is formed at a lower end portion of the lower accommodating portion 146 to open in a downward direction. An assembly W of the control unit case 172, the control unit 38 and the connectors 74 are inserted into the control unit accommodating member 110 through the insertion opening 154. A coupling port 156 is formed at an upper end portion of the lower accommodating portion 146. At least one (in this embodiment, four) displacement inhibiting portion 158 is formed integrally with a lower end portion inner surface 146a of the lower accommodating portion 146.

Figure 12:
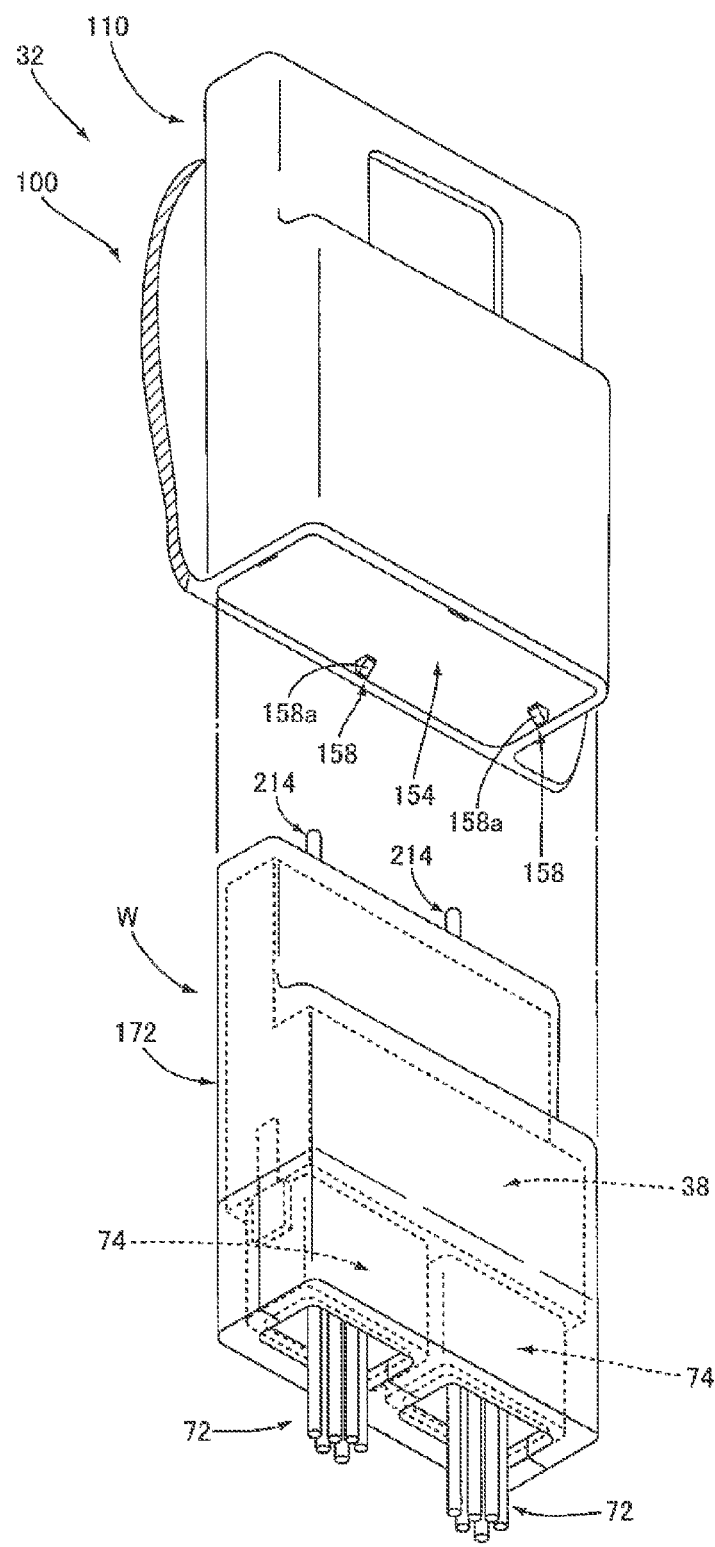
FIG. 12 is a perspective view showing a step of accommodating an assembly of the control unit case, the control unit and the connectors, into the control unit accommodating member.

The displacement inhibiting portion 158 serves to stop the connector cover 202 to inhibit the connector cover 202 from being displaced. In this embodiment, the displacement inhibiting portion 158 protrudes from the lower end portion inner surface 146a of the lower accommodating portion 146 to inhibit the connector cover 202 from being displaced in a downward direction. A side surface 158a of the displacement inhibiting portion 158 is tilted upward in an inward direction. An upper end surface 158b of the displacement inhibiting portion 158 is parallel to a lower end surface of the connector cover 202. As shown in FIG. 12, when the assembly W is accommodated into the control unit accommodating member 110, the control unit case 172 accommodating the control unit 38 and the connector 74 is inserted into the control unit accommodating member 110 while the control unit case 172 is slid along the side surface 158a of the displacement inhibiting portion 158 through the insertion opening 154. As shown in FIG. 11A, after the insertion, the upper end surface 158b of the displacement inhibiting portion 158 serves to stop the lower end surface of the connector cover 202, thereby preventing the control unit case 172 from disengaging from the control unit accommodating member 110.

The upper accommodating portion 152 is configured to accommodate the control unit 38 and a portion of the control unit case 172 except for the lower portion thereof. The inner peripheral surface of the upper accommodating portion 152 has the same shape (stepped shape 160 in this embodiment) as the outer peripheral surface of the portion of the control unit case 172 except for the lower portion, to accommodate that portion of the control unit case 172 without a clearance. A coupling port 162 is formed at a lower end portion of the upper accommodating portion 152 and is coupled to the lower accommodating portion 146. A top plate portion 164 is formed at an upper end portion of the upper accommodating portion 152. The top plate portion 164 has the insertion holes 112 into which the engagement protrusions 214 are inserted, respectively. A window 166 is formed at a portion of the upper accommodating portion 152 which is above the stepped portion 160. Through the window 166, a part of the control unit case 172 accommodated into the control unit accommodating member 110 is exposed outside through the window 166.

[Accommodating Method of Control Unit]

FIG. 12 is a perspective view showing a step of accommodating the assembly W of the control unit case 172, the control unit 38 and the connectors 74 into the control unit accommodating member 110.

When the control unit 38 is attached to the side surface of the air cleaner box 100, initially, as shown in FIG. 10, the lower case 104 and the upper case 106 are joined to each other to form the air cleaner box 100, thereby forming the control unit accommodating member 110 on the side surface of the air cleaner box 100. As shown in FIG. 8, the control unit 38 is accommodated into the control unit case 172 and the connectors 74 are coupled to the coupling members 176 of the control unit 38, respectively, to form the assembly W (FIG. 11) of the control unit case 172, the control unit 38 and the connectors 74. Then, as shown in FIG. 12, the assembly W is inserted into the control unit accommodating member 110 through the insertion opening 154, and the engagement protrusions 214 provided at the upper end portion of the assembly W are inserted into the engagement holes 112, respectively (FIG. 9).

When the assembly W is inserted into the control unit accommodating member 110 through the insertion opening 154, the displacement inhibiting portions 158 become an obstruction. However, the displacement inhibiting portions 158 protrude inward such that the side surfaces 158a are tilted upward and the control unit case 172 is formed of the rubber elastic material, the control unit case 172 can be elastically deformed by the displacement inhibiting portions 158 and inserted into the control unit accommodating member 110. As shown in FIG. 9, since the outer diameter of the protruding portion 214a of the engagement protrusion 214 is equal to or smaller than the inner diameter of the engagement hole 112, the protruding portions 214a can be inserted into the engagement holes 112, respectively, with a force for inserting the assembly W. After the protruding portions 214a protrude upward from the upper surface 110a of the control unit accommodating member 110, the protruding portions 214a can be pulled by fingers or a tool. This makes it possible to insert the engagement portion 214c into the engagement hole 112 although the outer diameter of the lower end portion of the engagement portion 214c is larger than the inner diameter of the engagement hole 112.

When the operation for accommodating the assembly W into the control unit accommodating member 110 is completed, as shown in FIG. 2, the air cleaner box 100 of the air cleaner 32 is positioned above the engine E, and between the frame members 12a and 12b, the opening 110c of the control unit accommodating member 110 is positioned below the upper surface of the frame member 12b, and under this condition, the air cleaner box 100 is fastened to the frame 12 using bolts and others. As shown in FIG. 4, the wire harnesses 72 drawn out through the insertion opening 154 of the control unit accommodating member 110 are guided downward to a location below the air cleaner box 100, and the electric wires 72a constituting the wire harnesses 72 are coupled to the relay box 36 and to the engine E (injector 56, etc.). Further, as shown in FIG. 2, the air-intake duct 111 is coupled to the air inlet 112a, the throttle device 54 is coupled to the air outlets 112b via the ducts (not shown), and the fuel tank 28 is disposed above the air cleaner box 100 so as to cover the air cleaner box 100 from above.

As shown in FIG. 4, when the engine E is viewed from above, the center line Q2 of the combustion chamber line L is closer to the opposite side (left side in this embodiment) of the cam chain tunnel 64 than the center line Q1 of the engine E and the center line Q3 of the frame 12, and thereby, a center line Q4 of the passage R of the air cleaner 32 is closer to the opposite side (left side in this embodiment) of the cam chain tunnel 64 than the center lines Q1 and Q3. This provides an extra space U, which is relatively wide, above the cam chain tunnel 64 between the frame members 12a and 12b, because it is not necessary to dispose the passage R in this space. In this embodiment, the control unit accommodating member 110 and the control unit 38 are disposed in this wide extra space U.

[Configuration of Cover]

Referring to FIG. 4, the first cover 34 is a plate-shaped member configured to cover at least a portion of the side surface of the air cleaner box 100 from outside (left side in this embodiment) in the width direction. As shown in FIGS. 5A and 5B, seat portions 130 having threaded holes into which the fastener screws 80 are respectively threadingly engageable and the fastener belt 84 having the engagement protrusion 84a are formed integrally at a portion of the inner surface of the first cover 34, which is opposite to the front portion of the air cleaner box 100.

The fastening portion 82 of the relay box case 76 is fastened to the corresponding seat portion 130 by the fastener screw 80. The fastener belt 84 of the first cover 34 is inserted into the slit 86a of the engagement portion 86, and the engagement protrusion 84a of the fastener belt 84 is engaged with a peripheral portion of the slit 86a. In other words, the relay box case 76, which serves as a support member, is fastened to the inner surface of the first cover 34. Thus, the relay box 36 accommodated into the relay box case 76 is supported on the inner surface of the first cover 34.

As shown in FIG. 4, the second cover 35 is a plate-shaped member configured to cover at least a portion of the side surface of the air cleaner box 100 from outside (right side in this embodiment) in the width direction. The second cover 35 and the first cover 34 are configured to be symmetric in the rightward and leftward direction.

The first cover 34 extends upward from an outer side surface of an upper end portion of the frame member 12a such that it is tilted inward relative the frame member 12a, while the second cover 35 extends upward from an outer side surface of an upper end portion of the frame member 12b such that it is tilted inward relative the frame member 12b. As shown in FIG. 4, the extra space U is formed in a left region defined by the first cover 34, the frame member 12a and the air cleaner box 100, while the extra space U is formed in a right region defined by second cover 35, the frame member 12b and the air cleaner box 100.

As shown in FIGS. 5A and 5B, with the first cover 34 covering at least a portion of the side surface of the air cleaner box 100 (FIG. 4) from outside, the lower edge 34a of the first cover 34 is disposed along the outer side surface of the frame member 12a and the relay box 36 supported on the inner surface of the first cover 34 is disposed inward relative to the outer side surface of the frame 12. At least a portion of the relay box 36 is disposed right above the frame member 12a. An upper end of the relay box 36 (upper end of the relay box case 76 in this embodiment) is disposed below an upper end of the air cleaner box 100.

As shown in FIG. 4, there is a gap M between the air cleaner box 100 and the relay box 36, to be precise, between the air cleaner box 100 and the relay box case 76 in this embodiment, to radiate heat generated in the relay box 36. In addition, there is a gap N between the air cleaner box 100 and the frame member 12a, and the connectors 74 (see FIGS. 5A and 5B) coupled to the relay box 36 are disposed in the gap N, to extend downward.

Since in this embodiment, the cam chain 66 (FIG. 3) as the driving power transmission mechanism, is disposed at the right side, the first cover 34 and the relay box 36 are disposed at an opposite side of the cam chain 66, and the second cover 35 and the control unit 38 are disposed at the side where the cam chain 66 is disposed.

[Advantages Achieved by Embodiment 1]

In accordance with Embodiment 1, the following advantages are achieved.

Since the relay box 36, which is the first electric component, is positioned laterally leftward relative to the air cleaner box 100 and the control unit 38, which is the second electric component, is positioned laterally rightward relative to the air cleaner box 100, a sum of a height of the air cleaner 32, a height of the relay box 36, and a height of the control unit 38 is not increased, and hence the fuel tank 28 and the like disposed above the air cleaner 32 are made lower. As a result, flexibility of the driver's attitude during driving, etc. is improved.

Since a gap between the air cleaner box 100 and the fuel tank 28 can be made smaller than in a case where the electric components are disposed above the air cleaner box 100, a volume of the air cleaner box 100 can be increased. As a result, an air-intake resistance in the passage R of the air cleaner box 100 can be reduced and a driving power of the engine E can be improved.

Since the dimension of the front portion of the air cleaner box 100 in the rightward and leftward direction is smaller than the dimension of the rear portion of the air cleaner box 100 in the rightward and leftward direction, the extra spaces U which are relatively wider can be provided in locations laterally relative to the front portion (including enlarged portion 33) of the air cleaner box 100 than in locations laterally relative to the rear portion of the air cleaner box 100. Since the relay box 36 and the control unit 38 are disposed in these wider extra spaces U, respectively, the volume of the air cleaner box 100 is not reduced because of the presence of the relay box 36 and the control unit 38.

Since the relay box 36 is disposed inward relative to the outer side surface of the frame 12 in the extra space U located right above the frame member 12a, the presence of the relay box 36 does not increase overall dimension of these components in the rightward and leftward direction.

Since the relay box 36 and the control unit 38 are disposed at the left side and at the right side, respectively, it is possible to prevent the passage R inside the air cleaner box 100 from concentrating significantly at the left side or to the right side. As a result, the air-intake resistance in the passage R can be reduced and the driving power of the engine E can be increased.

Since the electric wires 72a of the wire harnesses 72 for electrically coupling the relay box 36 to the control unit 38 can be made short by extending them along the outer side surface of the air cleaner box 100, electric communication efficiency can be improved (i.e., electric loss is reduced) and light weight is achieved.

Since the connectors 74 of each of the relay box 36 (FIG. 5A) and the control unit 38 (FIG. 6) are disposed to face downward, the wire harnesses 72 for electrically connecting the relay box 36 to the control unit 38 can be extended downward from the connectors 74 and bent in a U-shape. By doing so, a curvature of the wires can be increased as compared to a case where the wire harnesses 72 are not extended downward.

Since the relay box 36 and the control unit 38 are positioned laterally relative to the air cleaner box 100 disposed in the vicinity of (in this embodiment, right above) the engine E, distances between the relay box 36 and the control unit 38, and sensors and engine control electric components disposed around the Engine E can be reduced. Therefore, the electric wires 72a of the wire harnesses 72 for electrically coupling these components can be made short to improve communication efficiency and to reduce a weight. Furthermore, since a distance between the relay box 36 and the engine E and a distance between the control unit 38 and the engine E are short, a high communication efficiency is attained even if they are configured to communicate with each other via radio waves.

Since the air (ram air) is taken into the air cleaner box 100 and the air cleaner box 100 and its surrounding region are cooled by the air, a temperature increase in the relay box 36 and a temperature increase in the control unit 38 which are positioned laterally relative to the air cleaner box 100 can be suppressed effectively.

The air flowing through the gap M formed between the air cleaner box 100 and the relay box 36 facilitates cooling of the relay box 36.

Since the relay box case 76 which serves as the support member for supporting the relay box 36 is provided at the first cover 34 such that the relay box case 76 is apart from the air cleaner box 100, it is possible to prevent a vibration of the engine E from being transmitted to the relay box case 76 via the air cleaner box 100. In addition, since the case body 78 is formed of the rubber elastic material, a vibration of the relay box 36 can be suppressed effectively.

Since an air-intake noise generated in the passage R can be blocked by the relay box 36 and the control unit 38 which are positioned at the side surfaces of the air cleaner box 100, a noise is prevented.

When the air filter 102 of the air cleaner 32 is changed, the relay box 36 can be easily detached along with the first cover 34. Thus, a change of the air filter 102 can be easily carried out.

Since the connectors 74 are provided at end portions of the wire harnesses 72, the connectors 74 coupled to the coupling members 176 of the control unit 38 are covered with the connector cover 202 along with the disengagement portion 192, and a portion of the connector cover 202 which covers the disengagement portion 192 is covered with the control unit accommodating member 110, a thief cannot access the disengagement portion 192 through the insertion opening 154. Since the insertion opening 154 of the control unit accommodating member 110 is positioned below an upper end portion of the frame 12 which is in close proximity to the insertion opening 154, and the insertion opening 154 is covered with the frame 12 when viewed from the side, the frame 12 also serves to inhibit the thief from accessing the control unit 38 through the insertion opening 154.

(Embodiment 2)

Figure 13:
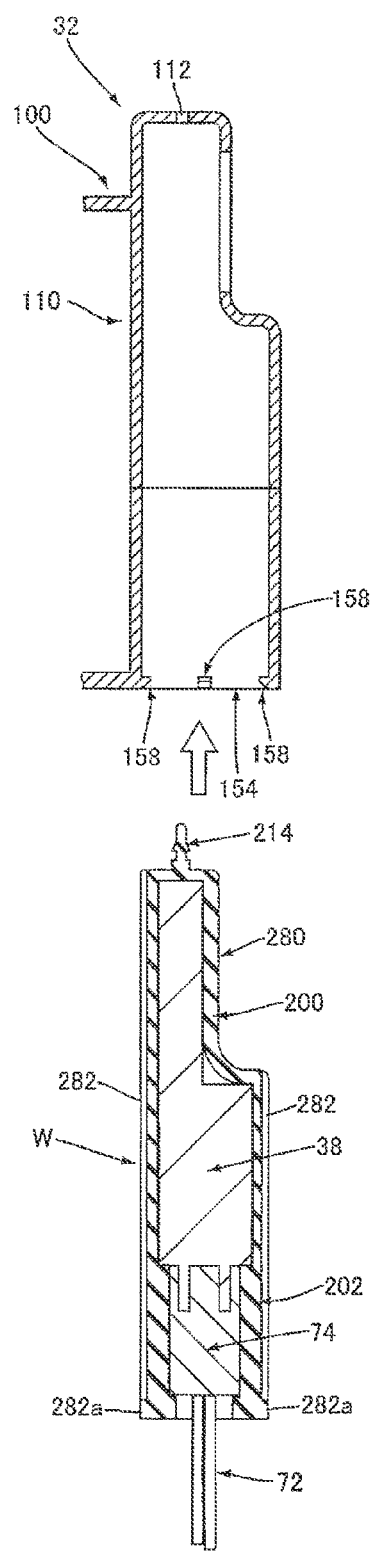
FIG. 13 is a cross-sectional view showing a step of accommodating the assembly including the control unit into the control unit accommodating member, in a motorcycle according to Embodiment 2.

Referring to FIG. 13, a motorcycle according to Embodiment 2 includes a control unit case 280 which replaces the control unit case 172 (FIG. 7). The other constituents of the motorcycle are identical to those of the motorcycle 10 of Embodiment 1.

Like the control unit case 172, the control unit case 280 includes the anti-vibration case 200 and the connector cover 202. At least one groove 282 is formed on an outer surface of at least one of the anti-vibration case 200 and the connector cover 202 to extend along the direction in which the control unit case 280 is inserted into the control unit accommodating member 110. The displacement inhibiting portion 158 passes through the groove 282 when the control unit case 280 is inserted into the control unit accommodating member 110.

In accordance with this configuration of Embodiment 2, friction resistance between the outer surface of the control unit case 280 and the displacement inhibiting portion 158 can be reduced, which makes it easy to insert the anti-vibration case 200 into the control unit accommodating member 110. To enable the displacement inhibiting portion 158 to surely stop the connector cover 202, it is desirable to provide a portion where the groove 282 is not present, i.e., a stopper portion 282a, at an outer surface of a lower end portion of the connector cover 202.

(Embodiment 3)

Figure 14:
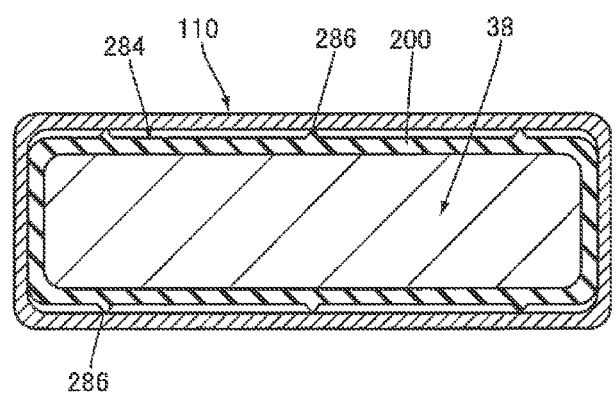
FIG. 14 is a cross-sectional view showing a mounting structure of the control unit with respect to the air cleaner box (control unit accommodating member) in a motorcycle according to Embodiment 3.

Referring to FIG. 14, a motorcycle according to Embodiment 3 includes a control unit case 284 which replaces the control unit case 172 (FIG. 7). The other constituents of the motorcycle are identical to those of the motorcycle 10 of Embodiment 1.

Like the control unit case 172, the control unit case 284 includes the anti-vibration case 200 and the connector cover 202 (not shown). At least one line-shaped protrusion 286 is formed on an outer surface of at least the anti-vibration case 200 to extend along the direction in which the control unit case 284 is inserted into the control unit accommodating member 110. The protrusion 286 is configured to contact an inner surface of the control unit accommodating member 110.

In accordance with Embodiment 3, the anti-vibration case 200 can be surely fixed inside the control unit accommodating member 110 so that a vibration of the anti-vibration case 200 can be suppressed and a vibration which would be transmitted to the control unit 38 can be absorbed effectively. When the anti-vibration case 200 is inserted into the control unit accommodating member 110, the protrusion 286 serves to reduce a contact area of the control unit accommodating member 110 and the anti-vibration case 200, which reduces an insertion resistance. As a result, an operation for inserting the anti-vibration case 200 into the control unit accommodating member 110 is easily carried out.

The shape of the protrusion 286 is not particularly limited to the line shape but may be a dot shape. The protrusion 286 may be formed on the inner surface of the control unit accommodating member 110 and configured to contact the outer surface of the anti-vibration case 200. Alternatively, the protrusion 286 may be provided on both of the outer surface of the anti-vibration case 200 and the inner surface of the control unit accommodating member 110.

(Embodiment 4)

Figure 15:
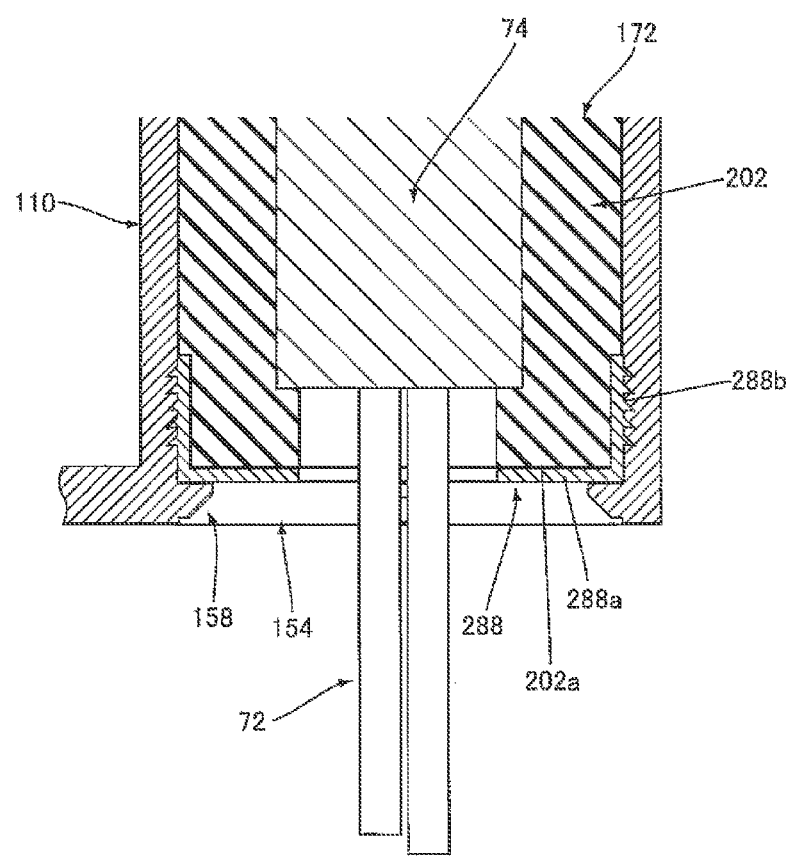
FIG. 15 is a partially enlarged cross-sectional view showing a mounting structure of the control unit with respect to the air cleaner box (control unit accommodating member) in a motorcycle according to Embodiment 4.

Referring to FIG. 15, a motorcycle according to Embodiment 4 includes a displacement inhibiting member 288 formed on the inner surface of the control unit accommodating member 110 to stop the connector cover 202 to inhibit the connector cover 202 from being displaced. The other constituents of the motorcycle are identical to those of the motorcycle 10 of Embodiment 1.

The displacement inhibiting member 288 includes an annular first stopper portion 288a configured to stop the lower end surface 202a of the connector cover 202 and at least one second stopper portion 288b which is formed integrally with the first stopper portion 288a and is engageable with the inner surface of the control unit accommodating member 110. In accordance with Embodiment 4, the displacement inhibiting member 288 can surely inhibit the connector cover 202 from disengaging from the control unit accommodating member 110. As a result, a theft of the control unit 38 can be prevented more effectively.

The shape of the first stopper portion 288a is not particularly limited so long as it is capable of inhibiting the connector cover 202 from being displaced from the control unit accommodating member 110. In addition, the shape of the second stopper portion 288b is not limited so long as it is attached to the inner surface of the control unit accommodating member 110. For example, the second stopper portion 288b may have a shape of a tube provided with teeth engageable with the inner space of the control unit accommodating member 110, on its outer peripheral surface, and the first stopper portion 288a may be protrusive from the second stopper portion 288b.

(Embodiment 5)

Figure 16:
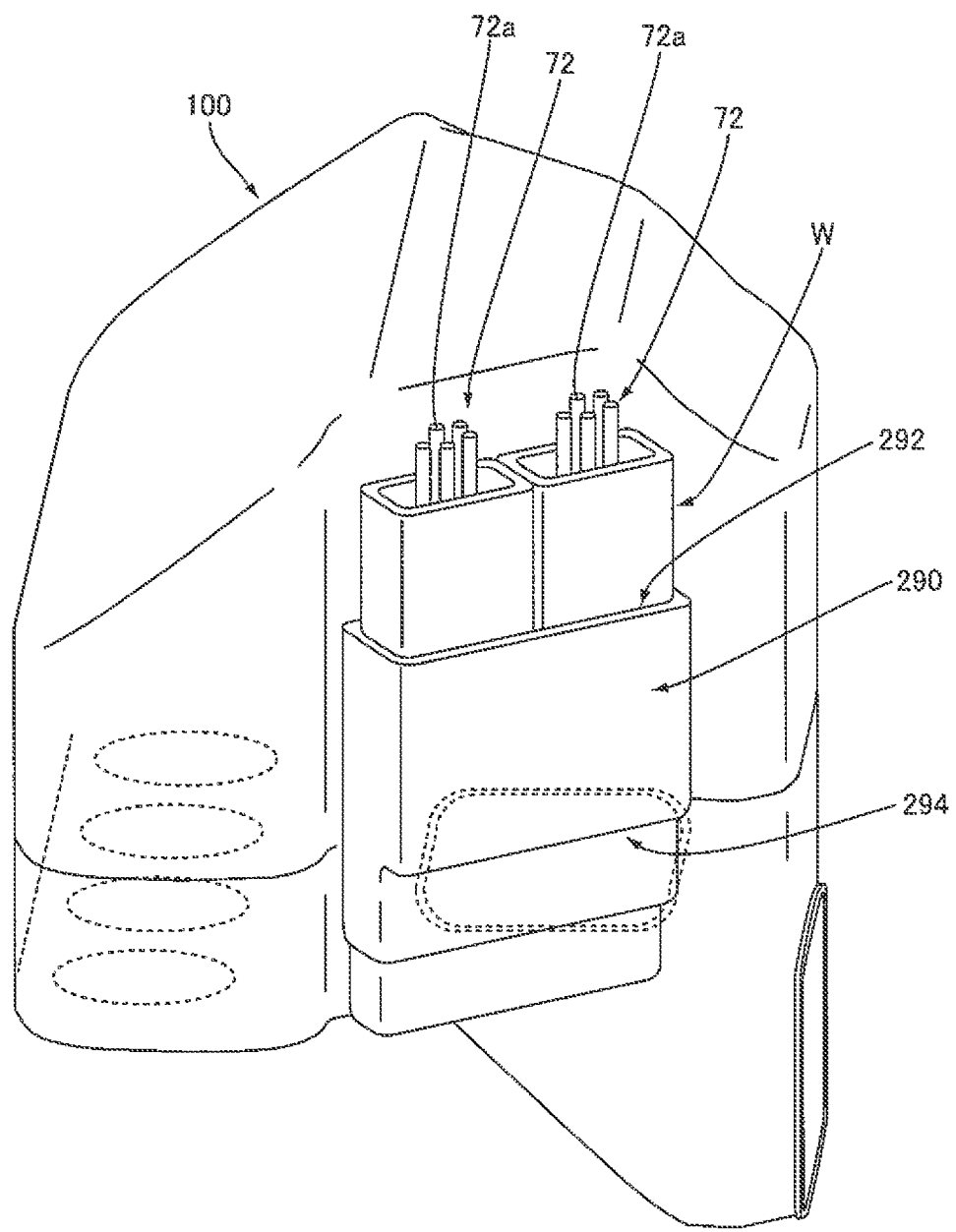
FIG. 16 is a perspective view showing a state where the control unit is attached to the air cleaner box in a motorcycle according to Embodiment 5.
Figure 17:
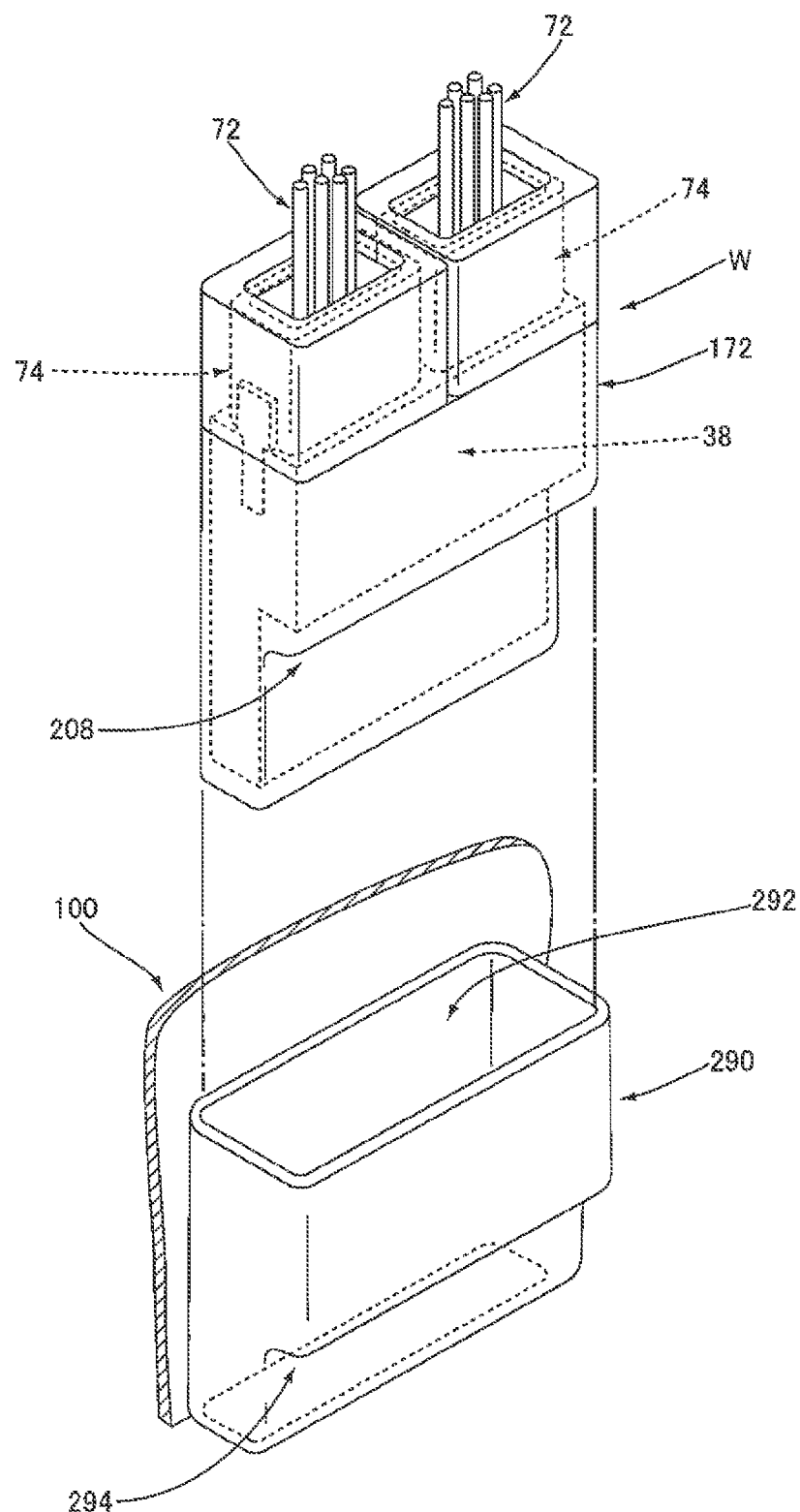
FIG. 17 is a perspective view showing a step of accommodating the assembly including the control unit into the control unit accommodating member, in a motorcycle according to Embodiment 5.

Referring to FIGS. 16 and 17, a motorcycle according to Embodiment 5 includes a control unit accommodating member 290 which replaces the control unit accommodating member 110, and is configured to accommodate the assembly W of the control unit case 172, the control unit 38 and the connectors 74 such that the connectors 74 are located at the upper side. The other constituents of the motorcycle are identical to those of the motorcycle 10 of Embodiment 1.

To be specific, in Embodiment 5, the control unit accommodating member 290 is provided at an upper end portion thereof with an insertion opening 292 through which the assembly W is inserted into the control unit accommodating member 290. The insertion opening 292 is covered with the fuel tank 28 (FIG. 1) from above. The wire harnesses 72 drawn out through the insertion opening 292 are guided to a location below the air cleaner box 100 through a gap between the insertion opening 292 and the fuel tank 28. The electric wires 72a are coupled to the relay box 36 and to the engine E.

In accordance with Embodiment 5, the fuel tank 28 can serve to inhibit the thief from accessing the control unit 38 through the insertion opening 292. As a result, a theft of the control unit 38 can be prevented effectively. In addition, a stepped portion 294 of the control unit accommodating member 290 serves to stop a stepped portion 208 of the control unit case 172 to prevent the assembly W from falling off.

Although the displacement inhibiting portion 158 (FIG. 11) and the displacement inhibiting member 288 (FIG. 15) need not be used to prevent the assembly W from falling off in Embodiment 5, a displacement inhibiting portion and a displacement inhibiting member having structures similar to those of the displacement inhibiting portion 158 and the displacement inhibiting member 288 may be used to prevent a vertical vibration.

(Embodiment 6)

Figure 18:
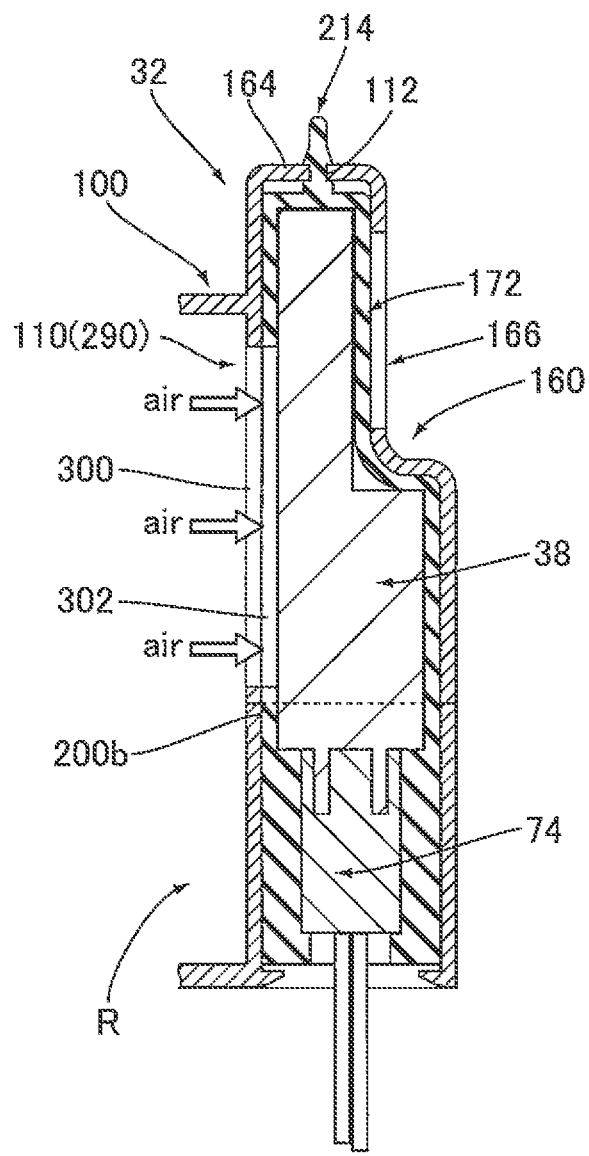
FIG. 18 is a cross-sectional view showing a mounting structure of the control unit with respect to the air cleaner box (control unit accommodating member) in a motorcycle according to Embodiment 6.

Referring to FIG. 18, in a motorcycle according to Embodiment 6, an air hole 300 is formed on a side wall of the air cleaner box 100 forming a portion of any one of the control unit accommodating members 110 and 290 (control unit accommodating member 110 in FIG. 18) and an air hole 302 is formed on a side surface of the control unit case 172 to communicate with the air hole 300. The other constituents of the motorcycle are identical to those of the motorcycle 10 of Embodiment 1. In other words, in Embodiment 6, a portion of an outer surface of the control unit 38 is exposed in an inner space of the air cleaner box 100 through the air holes 300 and 302.

Therefore, in Embodiment 6, the air flowing through the passage R of the air cleaner box 100 is directly applied to a portion of the outer surface of the control unit 38 to efficiently cool the control unit 38. Since the control unit case 172 is formed of an elastic rubber material such as rubber or elastomer, inner peripheral portions of the air holes 300 and 302 can be sealed by the control unit case 172. Thus, the control unit 38 is cooled effectively with a simple configuration without a special seal member.

The air hole 300 is desirably provided at the dirty side (i.e., upstream side of the air filter 102) of the passage R because the air before being cleaned by the air filter 102 is used to cool the control unit 308. To implement such an arrangement, the shape of the air cleaner box 100, the position of the air filter 102, etc., may be suitably changed. The shape, size and the number of the air holes 300 and 302 are not particularly limited, but may be changed on condition that the control unit case 172 can perform a sealing function as described above.

(Other Embodiment)

Although the air cleaner box 100 is disposed right above the engine E and the fuel tank 28 is disposed right above the air cleaner box 100, the air cleaner box 100 may be disposed laterally relative to the engine E, and the fuel tank 28 may be disposed laterally relative to the air cleaner box 100.

Although the relay box 36 is used as the first electric component and the control unit 38 is used as the second electric component in Embodiment 1, other electric components such as a fuse box, a communication device (GPS, ETC, etc.), or a brake control unit may be used as at least one of the first electric component and the second electric component.

Although the first electric component is positioned leftward relative to the air cleaner box 100 and the second electric component is positioned rightward relative to the air cleaner box 100, the first electric component may be positioned rightward, forward, rearward, etc., relative to the air cleaner box 100, instead of leftward, and the second electric component may be positioned leftward, forward, rearward, etc., relative to the air cleaner box 100, instead of rightward. As described above, since the wide extra space U can be ensured above the cam chain tunnel 64 and the cam chain 66 (driving power transmission mechanism), one of the first electric component and the second electric component, which is larger in size, may be disposed in the wide extra space U, and the other which is smaller in size may be disposed in the other extra space U, the whole of the extra spaces U can be efficiently used.

In other embodiments, the first and second electric components may be positioned laterally relative to the air cleaner box 100 such that the first and second electric components are arranged in the forward and rearward direction. In this case, since the length of the wire harnesses for electrically coupling the first component to the second component can be reduced, improvement of a communication efficiency and reduction of a weight are achieved.

In other embodiments, both of the first electric component and the second electric component may be attached to one of the air cleaner box 100 and the cover 34 or 35, or otherwise, at least one of the first and second electric components may be attached to the frame 12.

Although the case body 78 of the relay box case 76 is fastened to the first cover 34 using the fastener screws 80 and the fastener belt 84 in Embodiment 1, the case body 78 may be fastened to the first cover 34 in any other suitable way. In other embodiments, for example, the case body 78 may be fastened to the first cover 34 in such a manner that the base body 78 is inserted into a receiver (not shown) which is a fastener member provided at the first cover 34.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A straddle vehicle comprising:
   an engine;
   an air cleaner including an air cleaner box forming a passage through which air is supplied to the engine and an air filter for cleaning the air flowing through the passage; and
   a first electric component positioned laterally relative to the air cleaner box;
   wherein the first electric component is positioned laterally relative to the air cleaner box in a vehicle width direction when viewed from above such that the first electric component overlaps with the air cleaner box when viewed from a side.

2. The straddle vehicle according to claim 1, further comprising:
   a vehicle body frame positioned laterally relative to the air cleaner box;
   wherein a portion of the air cleaner box protrudes upward from the vehicle body frame; and
   the first electric component is positioned to overlap with the protruding portion of the air cleaner box when viewed from the side.

3. The straddle vehicle according to claim 1,
   wherein the first electric component is positioned at a side wall of the air cleaner box.

4. A straddle vehicle, comprising:
   an engine;
   an air cleaner including an air cleaner box forming a passage through which air is supplied to the engine and an air filter for cleaning the air flowing through the passage;
   a first electric component positioned laterally relative to the air cleaner box; and
   a support member provided to be apart from the air cleaner box and configured to support the first electric component.

5. The straddle vehicle according to claim 4, further comprising:
   a cover configured to cover at least a portion of a side surface of the air cleaner box from outside in a vehicle width direction;
   wherein the support member is provided at the cover.

6. A straddle vehicle, comprising,
   an engine;

an air cleaner including an air cleaner box forming a passage through which air is supplied to the engine and an air filter for cleaning the air flowing through the passage; and a first electric component positioned laterally relative to the air cleaner box;

wherein the air cleaner box has a width gradually increasing from a front end portion thereof toward a rear end portion thereof when viewed from above;

wherein the air cleaner box is provided at a front portion thereof with an air inlet communicating with an air duct;

wherein the air cleaner box is provided at a rear portion thereof with a plurality of air outlets respectively communicating with a plurality of combustion chambers provided in the engine; and wherein the first electric component is positioned laterally relative to the front portion of the air cleaner box.

7. A straddle vehicle, comprising:
an engine;
an air cleaner including an air cleaner box forming a passage through which air is supplied to the engine and an air filter for cleaning the air flowing through the passage; and
a first electric component positioned laterally relative to the air cleaner box; and
a second electric component positioned laterally relative to the air cleaner box,
wherein the first electric component is electrically coupled to the second electric component via an electric wire.

8. The straddle vehicle according to claim 7,
wherein the first electric component is positioned at one side of the air cleaner box in a rightward and leftward direction; and
the second electric component is positioned at an other side of the air cleaner box in the rightward and leftward direction.

9. A straddle vehicle, comprising,
an engine;
an air cleaner including an air cleaner box forming a passage through which air is supplied to the engine and an air filter for cleaning the air;
a fuel tank disposed above the air cleaner box and configured to store a fuel fed to the engine; and
a control unit configured to control the engine;
wherein the control unit is provided on a side surface of the air cleaner box; and
wherein the air cleaner box is provided integrally with a control unit accommodating member configured to accommodate the control unit.

10. The straddle vehicle according to claim 9,
wherein a wire harness is guided from the control unit in a downward direction to a location below the air cleaner box; and
the wire harness includes an electric wire electrically coupling the control unit to the engine.

11. The straddle vehicle according to claim 10,
wherein a connector is provided at an end portion of the wire harness;
the control unit has a coupling member to which the connector is coupled; and
the connector coupled to the coupling member is covered with a connector cover.

12. The straddle vehicle according to claim 11,
wherein the connector or the control unit includes a disengagement portion configured to provide disengagement between the connector and the control unit; and the disengagement portion is covered with the connector cover.

13. The straddle vehicle according to claim 12,
wherein the control unit accommodating member covers a portion of the connector cover which covers the disengagement portion.

14. The straddle vehicle according to claim 11,
wherein an anti-vibration case accommodating the control unit and the connector cover are integral with each other to form a control unit case.

15. The straddle vehicle according to claim 11,
wherein the control unit accommodating member is provided on an inner surface thereof with a displacement inhibiting portion or a displacement inhibiting member configured to stop the connector cover to inhibit the connector cover from being displaced.

16. The straddle vehicle according to claim 15,
wherein the displacement inhibiting portion is provided on an inner surface of the control unit accommodating member; and
the control unit accommodating member has an insertion opening through which the control unit is inserted into the control unit accommodating member;
wherein an anti-vibration case accommodating the control unit is inserted into the control unit accommodating member through the insertion opening along with the control unit; and
the anti-vibration case is provided on an outer surface thereof with a groove extending in a direction in which the control unit is inserted into the control unit accommodating member, the displacement inhibiting portion being configured to pass through the groove when the control unit is inserted into the control unit accommodating member.

17. The straddle vehicle according to claim 9,
wherein the control unit includes a unit body containing electronic components; and
the unit body is accommodated into an anti-vibration case.

18. The straddle vehicle according to claim 17,
wherein a protrusion is provided on at least one of an outer surface of the anti-vibration case and an inner surface of the control unit accommodating member and is configured to contact the other of the outer surface of the anti-vibration case and the inner surface of the control unit accommodating member.

19. The straddle vehicle according to claim 9,
wherein the control unit accommodating member has at a lower end portion thereof, an insertion opening through which the control unit is inserted into the control unit accommodating member.

20. The straddle vehicle according to claim 19, further comprising:
a frame to which the engine is mounted;
wherein the insertion opening is positioned below an upper end portion of a portion of the frame which is located in close proximity to the insertion opening of the control unit accommodating member.

21. The straddle vehicle according to claim 9,
wherein the control unit accommodating member is provided at an upper end portion thereof with an insertion opening through which the control unit is inserted into the control unit accommodating member, and the insertion opening is covered with the fuel tank.

22. A straddle vehicle comprising:
an engine;

an air cleaner including an air cleaner box forming a passage through which air is supplied to the engine and an air filter for cleaning the air;

a fuel tank disposed above the air cleaner box and configured to store a fuel fed to the engine; and a control unit configured to control the engine;

wherein the control unit is provided on a side surface of the air cleaner box in the vehicle width direction when viewed from above.

23. The straddle vehicle according to claim 22, wherein the engine includes a plurality of combustion chambers configured to combust a fuel fed from the fuel tank, valve mechanisms provided to respectively correspond to the plurality of combustion chambers, a cam mechanism configured to open and close each of the valve mechanisms, a driving power transmission mechanism configured to transmit a driving power to the cam mechanism, and a driving power transmission mechanism accommodating section provided at one side in a combustion chamber line direction in which each of the plurality of combustion chambers are aligned and configured to accommodate the driving power transmission mechanism;

wherein the air cleaner box is disposed above the engine;

wherein a space where the passage is not present is provided above the driving power transmission mechanism accommodating section; and wherein at least a portion of the control unit is disposed in the space where the passage is not present.

* * * * *